United States Patent
Soroushian et al.

(10) Patent No.: US 10,902,883 B2
(45) Date of Patent: Jan. 26, 2021

(54) SYSTEMS AND METHODS FOR PLAYING BACK MULTIMEDIA FILES INCORPORATING REDUCED INDEX STRUCTURES

(71) Applicant: DIVX, LLC, San Diego, CA (US)

(72) Inventors: Kourosh Soroushian, San Diego, CA (US); Roland Osborne, San Francisco, CA (US); Jason Braness, San Diego, CA (US); Shaiwal Priyadarshi, San Diego, CA (US)

(73) Assignee: DIVX, LLC, San Diego, CA (US)

(*) Notice: Subject to any disclaimer, the term of this patent is extended or adjusted under 35 U.S.C. 154(b) by 0 days.

(21) Appl. No.: 16/199,223

(22) Filed: Nov. 26, 2018

(65) Prior Publication Data
US 2019/0096440 A1    Mar. 28, 2019

Related U.S. Application Data

(63) Continuation of application No. 15/229,030, filed on Aug. 4, 2016, now Pat. No. 10,141,024, which is a
(Continued)

(51) Int. Cl.
*G11B 27/10*    (2006.01)
*G06F 16/40*    (2019.01)
(Continued)

(52) U.S. Cl.
CPC .......... *G11B 27/10* (2013.01); *G06F 16/2228* (2019.01); *G06F 16/40* (2019.01);
(Continued)

(58) Field of Classification Search
CPC ......... G06F 17/30017; G06F 17/30321; G06F 17/30852; G06F 17/30858; G06F 17/3002;
(Continued)

(56) References Cited

U.S. PATENT DOCUMENTS 4,009,331 A    2/1977  Goldmark et al.
4,694,357 A    9/1987  Rahman et al.
(Continued)

FOREIGN PATENT DOCUMENTS

BR    PI0416738 A    1/2007
CN    1221284 A    6/1999
(Continued)

OTHER PUBLICATIONS

Broadq—The Ultimate Home Entertainment Software, printed May 11, 2009 from ittp://web.srchive.org/web/20030401122010/www.broadq.com/qcasttuner/, 1 page.
(Continued)

*Primary Examiner* — Thai Q Tran
*Assistant Examiner* — Jose M Mesa
(74) *Attorney, Agent, or Firm* — KPPB LLP

(57) ABSTRACT

Playback and distribution systems and methods for multimedia files are provided. The multimedia files are encoded with indexes associated with the content data of the multimedia files. Through the use of the indexes, playback of the content is enhanced without significantly increasing the file size of the multimedia file.

20 Claims, 11 Drawing Sheets

Related U.S. Application Data continuation of application No. 13/560,884, filed on Jul. 27, 2012, now abandoned, which is a continuation of application No. 12/272,631, filed on Nov. 17, 2008, now Pat. No. 8,233,768.

(60) Provisional application No. 60/988,513, filed on Nov. 16, 2007.

(51) Int. Cl.
*G06F 16/41* (2019.01)
*G06F 16/71* (2019.01)
*G06F 16/74* (2019.01)
*G06F 16/22* (2019.01)

(52) U.S. Cl.
CPC .............. *G06F 16/41* (2019.01); *G06F 16/71* (2019.01); *G06F 16/745* (2019.01)

(58) Field of Classification Search
CPC .......... G06F 16/40; G06F 16/70; G06F 16/71; G06F 16/745; G06F 16/2228; G06F 16/41; G11B 27/10; G11B 27/034; G11B 27/031
USPC ....................................................... 386/241
See application file for complete search history.

(56) References Cited

U.S. PATENT DOCUMENTS

| | | |
|---|---|---|
| 4,802,170 A | 1/1989 | Trottier |
| 4,964,069 A | 10/1990 | Ely |
| 5,119,474 A | 6/1992 | Beitel et al. |
| 5,274,758 A | 12/1993 | Beitel et al. |
| 5,361,332 A | 11/1994 | Yoshida et al. |
| 5,396,497 A | 3/1995 | Veltman |
| 5,404,436 A | 4/1995 | Hamilton |
| 5,412,773 A | 5/1995 | Carlucci et al. |
| 5,420,801 A | 5/1995 | Dockter et al. |
| 5,420,974 A | 5/1995 | Morris et al. |
| 5,428,529 A | 6/1995 | Hartrick et al. |
| 5,471,576 A | 11/1995 | Yee |
| 5,485,611 A | 1/1996 | Astle |
| 5,487,167 A | 1/1996 | Dinallo et al. |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,583,652 A | 12/1996 | Ware |
| 5,619,338 A | 4/1997 | Nakai et al. |
| 5,621,794 A | 4/1997 | Matsuda et al. |
| 5,627,936 A | 5/1997 | Prasad et al. |
| 5,633,472 A | 5/1997 | DeWitt et al. |
| 5,642,171 A | 6/1997 | Baumgartner et al. |
| 5,642,338 A | 6/1997 | Fukushima et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,715,356 A | 2/1998 | Hirayama et al. |
| 5,719,786 A | 2/1998 | Nelson et al. |
| 5,745,643 A | 4/1998 | Mishina |
| 5,751,280 A | 5/1998 | Abbott |
| 5,763,800 A | 6/1998 | Rossum et al. |
| 5,765,164 A | 6/1998 | Prasad et al. |
| 5,794,018 A | 8/1998 | Vrvilo et al. |
| 5,809,173 A | 9/1998 | Liu et al. |
| 5,822,524 A | 10/1998 | Chen et al. |
| 5,828,370 A | 10/1998 | Moeller et al. |
| 5,844,575 A | 12/1998 | Reid |
| 5,848,217 A | 12/1998 | Tsukagoshi et al. |
| 5,903,261 A | 5/1999 | Walsh et al. |
| 5,907,597 A | 5/1999 | Mark |
| 5,907,658 A | 5/1999 | Murase et al. |
| 5,915,066 A | 6/1999 | Katayama |
| 5,956,729 A | 9/1999 | Goetz et al. |
| 5,959,690 A | 9/1999 | Toebes, VIII et al. |
| 5,970,147 A | 10/1999 | Davis |
| 6,009,237 A | 12/1999 | Hirabayashi et al. |
| 6,031,622 A | 2/2000 | Ristow et al. |
| 6,044,175 A | 3/2000 | Taira et al. |
| 6,046,778 A | 4/2000 | Nonomura et al. |
| 6,065,050 A | 5/2000 | DeMoney |
| 6,079,566 A | 6/2000 | Eleftheriadis et al. |
| 6,169,242 B1 | 1/2001 | Fay et al. |
| 6,195,388 B1 | 2/2001 | Choi et al. |
| 6,204,883 B1 | 3/2001 | Tsukagoshi |
| 6,219,043 B1 | 4/2001 | Yogeshwar et al. |
| 6,253,025 B1 | 6/2001 | Kitamura et al. |
| 6,308,005 B1 | 10/2001 | Ando et al. |
| 6,330,286 B1 | 12/2001 | Lyons et al. |
| 6,374,144 B1 | 4/2002 | Viviani et al. |
| 6,395,969 B1 | 5/2002 | Fuhrer |
| 6,573,907 B1 | 6/2003 | Madrane |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,693,959 B1 | 2/2004 | Eckart et al. |
| 6,697,568 B1 | 2/2004 | Kaku |
| 6,725,281 B1 | 4/2004 | Zintel et al. |
| 6,807,306 B1 | 10/2004 | Girgensohn et al. |
| 6,819,394 B1 * | 11/2004 | Nomura ............... G11B 27/031 352/38 |
| 6,856,997 B2 | 2/2005 | Lee et al. |
| 6,859,496 B1 | 2/2005 | Boroczky et al. |
| 6,917,652 B2 | 7/2005 | Lyu |
| 6,931,531 B1 | 8/2005 | Takahashi |
| 6,944,621 B1 | 9/2005 | Collart |
| 6,944,629 B1 | 9/2005 | Shioi et al. |
| 6,956,901 B2 | 10/2005 | Boroczky et al. |
| 6,985,588 B1 | 1/2006 | Glick et al. |
| 6,988,144 B1 | 1/2006 | Luken et al. |
| 7,103,906 B1 | 9/2006 | Katz et al. |
| 7,120,250 B2 | 10/2006 | Candelore |
| 7,127,155 B2 | 10/2006 | Ando et al. |
| 7,206,940 B2 | 4/2007 | Evans et al. |
| 7,209,892 B1 | 4/2007 | Galuten et al. |
| 7,212,726 B2 | 5/2007 | Zetts |
| 7,237,061 B1 | 6/2007 | Boic |
| 7,242,772 B1 | 7/2007 | Tehranchi |
| 7,243,346 B1 | 7/2007 | Seth et al. |
| 7,246,127 B2 | 7/2007 | Murakami et al. |
| 7,330,875 B1 | 2/2008 | Parasnis et al. |
| 7,340,528 B2 | 3/2008 | Noblecourt et al. |
| 7,356,245 B2 | 4/2008 | Belknap et al. |
| 7,366,788 B2 | 4/2008 | Jones et al. |
| 7,376,233 B2 | 5/2008 | Candelore et al. |
| 7,380,120 B1 | 5/2008 | Garcia |
| 7,454,780 B2 | 11/2008 | Katsube et al. |
| 7,457,359 B2 | 11/2008 | Mabey et al. |
| 7,478,325 B2 | 1/2009 | Foehr |
| 7,493,018 B2 | 2/2009 | Kim |
| 7,499,930 B2 | 3/2009 | Naka et al. |
| 7,499,938 B2 | 3/2009 | Collart |
| 7,519,274 B2 | 4/2009 | Li |
| 7,548,565 B2 * | 6/2009 | Sull ............... G06T 3/4092 370/503 |
| 7,681,035 B1 | 3/2010 | Ayars et al. |
| 7,788,271 B2 | 8/2010 | Soma et al. |
| 7,869,691 B2 | 1/2011 | Kelly et al. |
| 7,882,034 B2 | 2/2011 | Hug et al. |
| 7,949,703 B2 | 5/2011 | Matsuzaki et al. |
| 8,023,562 B2 | 9/2011 | Zheludkov et al. |
| 8,046,453 B2 | 10/2011 | Olaiya |
| 8,054,880 B2 | 11/2011 | Yu et al. |
| 8,082,442 B2 | 12/2011 | Keljo et al. |
| 8,195,714 B2 | 6/2012 | Mckibben et al. |
| 8,225,061 B2 | 7/2012 | Greenebaum |
| 8,233,768 B2 | 7/2012 | Soroushian et al. |
| 8,249,168 B2 | 8/2012 | Graves |
| 8,270,473 B2 | 9/2012 | Chen et al. |
| 8,270,819 B2 | 9/2012 | Vannier |
| 8,286,213 B2 | 10/2012 | Seo |

(56) References Cited

U.S. PATENT DOCUMENTS

| | | |
|---|---|---|
| 8,289,338 B2 | 10/2012 | Priyadarshi et al. |
| 8,311,115 B2 | 11/2012 | Gu et al. |
| 8,321,556 B1 | 11/2012 | Chatterjee et al. |
| 8,341,715 B2 | 12/2012 | Sherkin et al. |
| 8,386,621 B2 | 2/2013 | Park |
| 8,396,114 B2 | 3/2013 | Gu et al. |
| 8,407,753 B2 | 3/2013 | Kuo |
| 8,423,889 B1 | 4/2013 | Zagorie et al. |
| 8,456,380 B2 | 6/2013 | Pagan |
| 8,472,792 B2 | 6/2013 | Butt et al. |
| 8,677,428 B2 | 3/2014 | Lewis et al. |
| 8,731,369 B2 | 5/2014 | Li et al. |
| RE45,052 E | 7/2014 | Li |
| 8,767,825 B1 | 7/2014 | Wang et al. |
| 8,832,434 B2 | 9/2014 | Apostolopoulos et al. |
| 8,856,218 B1 | 10/2014 | Inskip |
| 8,914,534 B2 | 12/2014 | Braness et al. |
| 8,918,535 B2 | 12/2014 | Ma et al. |
| 8,948,249 B2 | 2/2015 | Sun et al. |
| 9,025,659 B2 | 5/2015 | Soroushian et al. |
| 9,203,816 B2 | 12/2015 | Brueck et al. |
| 9,215,466 B2 | 12/2015 | Zhai et al. |
| 9,253,178 B2 | 2/2016 | Blom et al. |
| 9,344,721 B2 | 5/2016 | Dikvall |
| 9,369,687 B2 | 6/2016 | Braness et al. |
| 9,420,287 B2 | 8/2016 | Butt et al. |
| 9,479,805 B2 | 10/2016 | Rothschild et al. |
| 9,485,546 B2 | 11/2016 | Chen et al. |
| 9,584,557 B2 | 2/2017 | Panje et al. |
| 9,584,847 B2 | 2/2017 | Ma et al. |
| 9,813,740 B2 | 11/2017 | Panje et al. |
| 10,032,485 B2 | 7/2018 | Ahsan et al. |
| 10,141,024 B2 | 11/2018 | Soroushian et al. |
| 2001/0030710 A1 | 10/2001 | Werner |
| 2002/0034252 A1 | 3/2002 | Owen et al. |
| 2002/0051494 A1 | 5/2002 | Yamaguchi et al. |
| 2002/0062313 A1 | 5/2002 | Lee et al. |
| 2002/0076112 A1 | 6/2002 | Devara |
| 2002/0087569 A1 | 7/2002 | Fischer et al. |
| 2002/0091665 A1 | 7/2002 | Beek et al. |
| 2002/0093571 A1 | 7/2002 | Hyodo |
| 2002/0110193 A1 | 8/2002 | Yoo et al. |
| 2002/0118953 A1 | 8/2002 | Kim |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0161462 A1 | 10/2002 | Fay et al. |
| 2002/0180929 A1 | 12/2002 | Tseng et al. |
| 2002/0184129 A1 | 12/2002 | Arena et al. |
| 2002/0184159 A1 | 12/2002 | Tadayon et al. |
| 2002/0184515 A1 | 12/2002 | Oho et al. |
| 2002/0186842 A1 | 12/2002 | Sabet-Sharghi et al. |
| 2002/0191112 A1 | 12/2002 | Akiyoshi et al. |
| 2002/0191960 A1 | 12/2002 | Fujinami et al. |
| 2003/0001964 A1 | 1/2003 | Masukura et al. |
| 2003/0002578 A1 | 1/2003 | Tsukagoshi et al. |
| 2003/0005442 A1 | 1/2003 | Brodersen et al. |
| 2003/0035488 A1 | 2/2003 | Barrau |
| 2003/0051149 A1 | 3/2003 | Robert |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0152370 A1 | 8/2003 | Otomo et al. |
| 2003/0159139 A1 | 8/2003 | Candelore et al. |
| 2003/0165328 A1 | 9/2003 | Grecia |
| 2003/0182297 A1 | 9/2003 | Murakami et al. |
| 2003/0185302 A1 | 10/2003 | Abrams |
| 2003/0185542 A1 | 10/2003 | McVeigh et al. |
| 2003/0188182 A1 | 10/2003 | Sato et al. |
| 2003/0202773 A1 | 10/2003 | Dow et al. |
| 2003/0206558 A1 | 11/2003 | Parkkinen et al. |
| 2003/0212993 A1 | 11/2003 | Obrador |
| 2003/0216922 A1 | 11/2003 | Gonzales et al. |
| 2003/0231863 A1 | 12/2003 | Eerenberg et al. |
| 2003/0231867 A1 | 12/2003 | Gates et al. |
| 2003/0236836 A1 | 12/2003 | Borthwick |
| 2004/0006701 A1 | 1/2004 | Kresina |
| 2004/0021684 A1 | 2/2004 | Millner |
| 2004/0025180 A1 | 2/2004 | Begeja et al. |
| 2004/0047614 A1 | 3/2004 | Green |
| 2004/0052501 A1 | 3/2004 | Tam |
| 2004/0071453 A1 | 4/2004 | Valderas |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0143760 A1 | 7/2004 | Alkove et al. |
| 2004/0146276 A1 | 7/2004 | Ogawa |
| 2004/0202322 A1 | 10/2004 | Chavanne et al. |
| 2004/0217971 A1 | 11/2004 | Kim |
| 2004/0255236 A1 | 12/2004 | Collart |
| 2005/0005025 A1 | 1/2005 | Harville et al. |
| 2005/0015797 A1 | 1/2005 | Noblecourt et al. |
| 2005/0019014 A1 | 1/2005 | Yoo et al. |
| 2005/0038826 A1 | 2/2005 | Bae et al. |
| 2005/0055399 A1 | 3/2005 | Savchuk |
| 2005/0078948 A1 | 4/2005 | Yoo et al. |
| 2005/0114534 A1 | 5/2005 | Lee |
| 2005/0123283 A1 | 6/2005 | Li et al. |
| 2005/0180641 A1 | 8/2005 | Clark |
| 2005/0192904 A1 | 9/2005 | Candelore |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0207442 A1 | 9/2005 | Zoest et al. |
| 2005/0207578 A1 | 9/2005 | Matsuyama et al. |
| 2005/0273695 A1 | 12/2005 | Schnurr |
| 2005/0275656 A1 | 12/2005 | Corbin et al. |
| 2006/0026302 A1 | 2/2006 | Bennett et al. |
| 2006/0078301 A1 | 4/2006 | Ikeda et al. |
| 2006/0093320 A1 | 5/2006 | Hallberg et al. |
| 2006/0129909 A1* | 6/2006 | Butt ............ G11B 20/10 715/201 |
| 2006/0168639 A1 | 7/2006 | Gan et al. |
| 2006/0173887 A1 | 8/2006 | Breitfeld et al. |
| 2006/0181965 A1 | 8/2006 | Collart |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2007/0005333 A1 | 1/2007 | Setiohardjo et al. |
| 2007/0031110 A1 | 2/2007 | Rijckaert |
| 2007/0047901 A1 | 3/2007 | Ando et al. |
| 2007/0067472 A1 | 3/2007 | Maertens et al. |
| 2007/0083617 A1 | 4/2007 | Chakrabarti et al. |
| 2007/0086528 A1 | 4/2007 | Mauchly et al. |
| 2007/0140647 A1 | 6/2007 | Kusunoki et al. |
| 2007/0154165 A1 | 7/2007 | Hemmeryckz-Deleersnijder et al. |
| 2007/0168287 A1 | 7/2007 | Mccarthy et al. |
| 2007/0168541 A1 | 7/2007 | Gupta et al. |
| 2007/0168542 A1 | 7/2007 | Gupta et al. |
| 2007/0180125 A1 | 8/2007 | Knowles et al. |
| 2007/0239839 A1 | 10/2007 | Buday et al. |
| 2007/0292107 A1 | 12/2007 | Yahata et al. |
| 2008/0077592 A1 | 3/2008 | Brodie et al. |
| 2008/0101466 A1 | 5/2008 | Swenson et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0126248 A1 | 5/2008 | Lee et al. |
| 2008/0137736 A1 | 6/2008 | Richardson et al. |
| 2008/0177775 A1 | 7/2008 | Kawate et al. |
| 2008/0192818 A1 | 8/2008 | DiPietro et al. |
| 2008/0201705 A1 | 8/2008 | Wookey |
| 2008/0256105 A1 | 10/2008 | Nogawa et al. |
| 2008/0263354 A1 | 10/2008 | Beuque et al. |
| 2008/0279535 A1 | 11/2008 | Haque et al. |
| 2008/0294691 A1 | 11/2008 | Chang et al. |
| 2008/0310496 A1 | 12/2008 | Fang |
| 2009/0031220 A1 | 1/2009 | Tranchant et al. |
| 2009/0037959 A1 | 2/2009 | Suh et al. |

(56) References Cited

U.S. PATENT DOCUMENTS

| | | |
|---|---|---|
| 2009/0060452 A1 | 3/2009 | Chaudhri |
| 2009/0064341 A1 | 3/2009 | Hartung et al. |
| 2009/0066839 A1 | 3/2009 | Jung et al. |
| 2009/0132599 A1 | 5/2009 | Soroushian et al. |
| 2009/0132721 A1 | 5/2009 | Soroushian et al. |
| 2009/0150557 A1 | 6/2009 | Wormley et al. |
| 2009/0165148 A1 | 6/2009 | Frey et al. |
| 2009/0169181 A1 | 7/2009 | Priyadarshi et al. |
| 2009/0201988 A1 | 8/2009 | Gazier et al. |
| 2009/0226148 A1 | 9/2009 | Nesvadba et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0313544 A1 | 12/2009 | Wood et al. |
| 2009/0313564 A1 | 12/2009 | Rottler et al. |
| 2009/0319563 A1 | 12/2009 | Schnell |
| 2009/0328124 A1 | 12/2009 | Khouzam et al. |
| 2010/0040351 A1 | 2/2010 | Toma et al. |
| 2010/0094969 A1 | 4/2010 | Zuckerman et al. |
| 2010/0095121 A1 | 4/2010 | Shetty et al. |
| 2010/0111192 A1 | 5/2010 | Graves |
| 2010/0158109 A1 | 6/2010 | Dahlby et al. |
| 2010/0189183 A1 | 7/2010 | Gu et al. |
| 2010/0218208 A1 | 8/2010 | Holden |
| 2010/0228795 A1 | 9/2010 | Hahn |
| 2011/0055585 A1 | 3/2011 | Lee |
| 2011/0080940 A1 | 4/2011 | Bocharov |
| 2011/0126191 A1 | 5/2011 | Hughes et al. |
| 2011/0129011 A1 | 6/2011 | Cilli et al. |
| 2011/0142415 A1 | 6/2011 | Rhyu |
| 2011/0150100 A1 | 6/2011 | Abadir |
| 2011/0153785 A1 | 6/2011 | Minborg et al. |
| 2011/0197267 A1 | 8/2011 | Gravel et al. |
| 2011/0239078 A1 | 9/2011 | Luby et al. |
| 2011/0246659 A1 | 10/2011 | Bouazizi |
| 2011/0268178 A1 | 11/2011 | Park et al. |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon |
| 2012/0017282 A1 | 1/2012 | Kang et al. |
| 2012/0023251 A1 | 1/2012 | Pyle et al. |
| 2012/0093214 A1 | 4/2012 | Urbach |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0278496 A1 | 11/2012 | Hsu |
| 2012/0307883 A1 | 12/2012 | Graves |
| 2013/0044821 A1 | 2/2013 | Braness et al. |
| 2013/0046902 A1 | 2/2013 | Villegas Nuñez et al. |
| 2013/0055084 A1 | 2/2013 | Soroushian et al. |
| 2013/0061045 A1 | 3/2013 | Kiefer et al. |
| 2013/0196292 A1 | 8/2013 | Brennen et al. |
| 2014/0211840 A1 | 7/2014 | Butt et al. |
| 2014/0250473 A1 | 9/2014 | Braness et al. |
| 2015/0104153 A1 | 4/2015 | Braness et al. |
| 2016/0360123 A1 | 12/2016 | Braness et al. |
| 2017/0004862 A1 | 1/2017 | Soroushian et al. |
| 2017/0025157 A1 | 1/2017 | Ahsan et al. |
| 2019/0080723 A1 | 3/2019 | Ahsan et al. |

FOREIGN PATENT DOCUMENTS

| | | |
|---|---|---|
| CN | 1723696 | 1/2006 |
| CN | 1873820 A | 12/2006 |
| CN | 101861583 A | 10/2010 |
| CN | 101861583 B | 6/2014 |
| EP | 644692 A2 | 3/1995 |
| EP | 0677961 A2 | 10/1995 |
| EP | 757484 A2 | 2/1997 |
| EP | 813167 A2 | 12/1997 |
| EP | 1187483 A2 | 3/2002 |
| EP | 1420580 A1 | 5/2004 |
| EP | 1692859 | 8/2006 |
| EP | 1718074 A1 | 11/2006 |
| EP | 2223232 A1 | 9/2010 |
| HK | 1112988 A | 9/2008 |
| HK | 1147813 | 8/2011 |
| JP | 07334938 A | 12/1995 |
| JP | 08163488 A | 6/1996 |
| JP | 08287613 A | 11/1996 |
| JP | 11328929 A | 11/1999 |
| JP | 02001043668 A | 2/2001 |
| JP | 2002170363 A | 6/2002 |
| JP | 2002218384 A | 8/2002 |
| JP | 2003023607 A | 1/2003 |
| JP | 2003250113 A | 9/2003 |
| JP | 2005027153 | 1/2005 |
| JP | 2007532044 A | 11/2007 |
| JP | 2011505648 A1 | 2/2011 |
| JP | 2012019548 A | 1/2012 |
| JP | 2013013146 A | 1/2013 |
| JP | 5513400 B2 | 6/2014 |
| JP | 5589043 B2 | 8/2014 |
| JP | 2014233086 A | 12/2014 |
| KR | 100221423 | 9/1999 |
| KR | 2002013664 | 2/2002 |
| KR | 1020020064888 A | 8/2002 |
| KR | 20060122893 A | 11/2006 |
| KR | 20110124325 A | 11/2011 |
| KR | 101127407 B1 | 3/2012 |
| KR | 20130006717 A | 1/2013 |
| KR | 101380262 B1 | 4/2014 |
| KR | 101380265 B1 | 4/2014 |
| SG | 161354 | 12/2012 |
| TR | 201508443 T4 | 8/2015 |
| WO | 1995015660 A1 | 6/1995 |
| WO | 1998046005 A2 | 10/1998 |
| WO | 1999037072 A2 | 7/1999 |
| WO | 0104892 A1 | 1/2001 |
| WO | 0126377 A1 | 4/2001 |
| WO | 2001031497 A1 | 5/2001 |
| WO | 2001050732 A2 | 7/2001 |
| WO | 2002001880 A1 | 1/2002 |
| WO | 03098475 A1 | 11/2003 |
| WO | 2004054247 A1 | 6/2004 |
| WO | 2004097811 A1 | 11/2004 |
| WO | 2004102571 A1 | 11/2004 |
| WO | 2005057906 A2 | 6/2005 |
| WO | 2007026837 A1 | 3/2007 |
| WO | 2009065137 A1 | 5/2009 |
| WO | 2010060106 A1 | 5/2010 |
| WO | 2010108053 A1 | 9/2010 |
| WO | 2010111261 A1 | 9/2010 |
| WO | 2010122447 A1 | 10/2010 |
| WO | 2012094171 A1 | 7/2012 |
| WO | 20120094181 A2 | 7/2012 |
| WO | 20120094189 A1 | 7/2012 |

OTHER PUBLICATIONS

European Search Report for Application 11855103.5, search completed Jun. 26, 2014, 9 pgs.

European Search Report for Application 11855237.1, search completed Jun. 12, 2014, 9 pgs.

European Supplementary Search Report for Application EP09759600, completed Jan. 25, 2011, 11 pgs.

Extended European Search Report for European Application EP15162562.1, Report Completed Jul. 21, 2015, dated Jul. 29, 2015, 4 pgs.

Federal Computer Week, "Tool Speeds Info to Vehicles", Jul. 25, 1999, 5 pgs.

Final draft ETSI ES 202 109, V1.1.1, ETSI Standard, Terrestrial Trunked Radio (TETRA); Security; Synchronization mechanism for end-to-end encryption, Oct. 2002, 17 pgs.

HTTP Live Streaming Overview, Networking & Internet, Apple, Inc., Apr. 1, 2011, 38 pgs.

IBM Corporation and Microsoft Corporation, "Multimedia Programming Interface and Data Specifications 1.0", Aug. 1991, printed

(56) References Cited

OTHER PUBLICATIONS from http://www.kk.iij4u.or.jp/~kondo/wave/mpidata.txt on Mar. 6, 2006, 100 pgs.
InformationWeek, "Internet on Wheels", InformationWeek: Front End: Daily Dose, Jul. 20, 1999, Printed on Mar. 26, 2014, 3 pgs.
International Preliminary Report on Patentability for International Application No. PCT/US2004/041667, Report dated Jul. 10, 2007, 7 pgs.
International Preliminary Report on Patentability for International Application No. PCT/US2006/000456, report dated Oct. 9, 2007, 5 pgs.
International Preliminary Report on Patentability for International Application No. PCT/US2008/083816, dated May 18, 2010, 6 pgs.
International Search Report and Written Opinion for International Application No. PCT/US09/46588, completed Jul. 13, 2009, dated Jul. 23, 2009, 7 pgs.
International Search Report and Written Opinion for International Application No. PCT/US2004/041667, completed May 24, 2007, dated Jun. 20, 2007, 6 pgs.
International Search Report and Written Opinion for International Application No. PCT/US2008/083816, completed Jan. 10, 2009, dated Jan. 22, 2009, 7 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Search Report for International Publication No. PCT/US2006/000456, completed May 19, 2007, dated Sep. 24, 2007, 1 page.
International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.
ISO/IEC 14496-2:2001(E), Information technology—Coding of audio-visual objects, Part 2: Visual, Dec. 1, 2001, 536 pgs. (presented in 5 parts).
ITS International, "Fleet System Opts for Mobile Server", Aug. 26, 1999, Printed on Oct. 21, 2011 from http://www.itsinternational.com/News/article.cfm?recordID=547, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
Linksys®: "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p, 4 pgs.
Microsoft Corporation, "Chapter 8, Multimedia File Formats" 1991, Microsoft Windows Multimedia Programmer's Reference, 23 pgs.
Microsoft Media Platform: Player Framework, "Microsoft Media Platform: Player Framework v2.5 (formerly Silverlight Media Framework)", May 3, 2011, 2 pgs.
Microsoft Media Platform: Player Framework, "Silverlight Media Framework v1.1", Jan. 2010, 2 pgs.
Microsoft Windows® XP Media Center Edition 2005, Frequently asked Questions, printed May 4, 2007 from http://www.microsoft.com/windowsxp/mediacenter/evaluation/faq.mspx, 6 pgs.
Microsoft Windows® XP Media Center Edition 2005: Features, printed May 9, 2007, from http://www.microsoft.com/windowsxp/mediacenter/evaluation/features.mspx, 4 pgs.
Open DML AVI-M-JPEG File Format Subcommittee, "Open DML AVI File Format Extensions", Version 1.02, Feb. 28, 1996, 29 pgs.
pc world.com, Future Gear: PC on the HiFi, and the TV, from http://www.pcworld.com/article/id,108818-page,1/article.html, printed May 4, 2007, from IDG Networks, 2 pgs.

Qtv—About BroadQ, printed May 11, 2009 from http://www.broadq.com/en/about.php, 1 page.
Supplementary European Search Report for Application No. EP 04813918, Search Completed Dec. 19, 2012, 3 pgs.
Transmission of Non-Telephone Signals, Video Coding for Low Bit Rate Communication, ITU-T Recommendation H.263, ITU-T Telecommunication Standardization Sector of ITU, Mar. 1996, 52 pgs.
W3C, Eds. Klyne, G. et al., Resource Description Framework (RDF): Concepts and Abstract Syntax, Section 3.3, Oct. 10, 2003, available online at https://www.w3.org/TR/2003/WD-rdf-concepts-20031010/#section-Datatypes-intro, 21 pgs.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.
Griffith, Eric, "The Wireless Digital Picture Frame Arrives", Wi-Fi Planet, printed May 4, 2007 from http://www.wi-fiplanet.com/news/article.php/3093141, Oct. 16, 2003, 3 pgs.
Hartung et al., "DRM Protected Dynamic Adaptive HTTP Streaming", MMSys 2011 Proceedings of the Second Annual ACM Conference on Multimedia Systems, San Jose, California, Feb. 23-25, 2011, 6 pgs.
Hurtado Guzman, Juan Esteban "Development and Implementation of an Adaptive HTTP Streaming Framework for H264/MVC Coded Media", Politecnico di Torino, Nov. 2010, 108 pgs.
Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, 10 pgs.
Inlet Technologies, "Adaptive Delivery to iDevices", 2010, 2 pgs.
Inlet Technologies, "Adaptive delivery to iPhone 3.0", 2009, 2 pgs.
Inlet Technologies, "HTTP versus RTMP", 2009, 3 pgs.
Inlet Technologies, "The World's First Live Smooth Streaming Event: The French Open", 2009, 2 pgs.
I-O Data, "Innovation of technology arrived", from http://www.iodata.com/catalogs/AVLP2DVDLA_Flyer200505.pdf, 2 pgs.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Lee et al., "Uniform Resource Identifiers (URI): Generic Syntax", Aug. 1998, Retrieved from: http://ietf.org/rfc/rfc2396.txt, 35 pgs.
Levkov, "Mobile Encoding Guidelines for Android Powered Devices", Adobe Systems Inc., Addendum B, Dec. 22, 2010, 42 pgs.
Lian et al., "Efficient video encryption scheme based on advanced video coding", Multimed. Tools Appl. vol. 38, 2008, 15 pgs.
Liu et al., "A Formal Framework for Component Deployment", OOPSLA 2006, Proceedings of the 21st Annual ACM SIGPLAN Conference on Object-Oriented Programming Systems, Language, and Applications, Portland, Oregon, Oct. 22-26, 2006, 19 pgs.
Long et al., "Silver: Simplifying Video Editing with Metadata", CHI 2003: New Horizons, Apr. 5-10, 2003, 2 pgs.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
Moscoso, Pedro Gomes "Interactive Internet TV Architecture Based on Scalable Video Coding", Instituto Superior Techico, Universidad Technica de Lisboa, May 2011, 103 pgs.
MSDN, "Adaptive streaming, Expression Studio 2.0", Apr. 23, 2009, 2 pgs.
Nelson, "Arithmetic Coding + Statistical Modeling = Data Compression: Part 1—Arithmetic Coding", Doctor Dobb's Journal, Feb. 1991, USA, 12 pgs.
Nelson, "Smooth Streaming Deployment Guide", Microsoft Expression Encoder, Aug. 2010, 66 pgs.
Noboru, "Play Fast and Fine Video on Web! codec", Co.9 No. 12, Dec. 1, 2003, 2 pgs.

(56) References Cited

OTHER PUBLICATIONS

Noe, A. "Matroska File Format (under construction!)", Retrieved from the Internet: URL:http://web.archive.orgweb/20070821155146/www.matroska.org/technical/specs/matroska.pdf [retrieved on Jan. 19, 2011], Jun. 24, 2007, 51 pgs.

Noe, Alexander "AVI File Format", http://www.alexander-noe.com/video/documentation/avi.pdf, Dec. 14, 2006, 26 pgs.

Noe, Alexander "Definitions", Apr. 11, 2006, retrieved from http://www.alexander-noe.com/video/amg/definitions.html on Oct. 16, 2013, 2 pgs.

Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.

Ozer, Jan "Adaptive Streaming in the Field", Streaming Media, Dec. 2010-Jan. 2011, 9 pgs.

Padiadpu, Rashmi "Towards Mobile Learning: A SCORM Player for the Google Android Platform", Master Thesis, Hamburg University of Applied Sciences, 2008, 66 pgs.

Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.

Pearce, Chris "Indexing keyframes in Ogg videos for fast seeking", Retrieved from: http://blog.pearce.org.nz/2010/01/indexing-keyframes-in-ogg-videos-for.html, Jan. 11, 2010, 4 pgs.

Peek, David "Consumer Distributed File Systems", Dissertation, Doctor of Philosophy, Computer Science and Engineering, The University of Michigan, 2009, 118 pgs.

Phamdo, "Theory of Data Compression", printed on Oct. 10, 2003, 12 pgs.

RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.

Rosenberg et al., "Indicating User Agent Capabilities in the Session Initiation Protocol (SIP)", Network Working Group, RFC 3840, Aug. 2004, 36 pgs.

Siglin, "HTTP Streaming: What You Need to Know", streamingmedia.com, 2010, 15 pgs.

Siglin, "Unifying Global Video Strategies, MP4 File Fragmentation for Broadcast, Mobile and Web Delivery", Nov. 16, 2011, 16 pgs.

Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 page.

Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . on Mar. 6, 2006, 7 pgs.

Unknown, "Entropy and Source Coding (Compression)", TCOM 570, Sep. 1999, 22 pgs.

Unknown, "MPEG-4 Video Encoder: Based on International Standard ISO/IEC 14496-2", Patni Computer Systems, Ltd., publication date unknown, 15 pgs.

Venkatramani et al., "Securing Media for Adaptive Streaming", Multimedia 2003 Proceedings of the Eleventh ACM International Conference on Multimedia, Nov. 2-8, 2003, Berkeley, California, 4 pgs.

Wan et al, "Variance-Based Color Image Quantization for Frame Buffer Display", Color Research & Application 15, No. 1 (1990), 7 pgs.

Zambelli, "IIS Smooth Streaming Technical Overview", Microsoft Corporation, Mar. 2009, 17 pgs.

Written Opinion for International Application No. PCT/US2004/041667, Filing Date Dec. 8, 2004, Report Completed May 24, 2007, dated Jun. 20, 2007, 4 pgs.

Written Opinion for International Application No. PCT/US2006/000456, report completed May 19, 2007, 4 pgs.

Written Opinion for International Application No. PCT/US2008/083816, Opinion completed Jan. 10, 2009, dated Jan. 22, 2009, 5 pgs.

Written Opinion for International Application No. PCT/US2009/046588, completed Jul. 14, 2009, dated Jul. 23, 2009, 5 pgs.

Extended European Search Report for European Application EP08849996.7, Report Completed Dec. 19, 2014, dated Jan. 23, 2015, 7 pgs.

3GPP TS 26.247, V1.3.0, 3rd Generation Partnership Project; Technical Specification Group Services and System Aspects Transparent end-to-end Packet-switches Streaming Services (PSS);, Progressive Download and Dynamic Adaptive Streaming over HTTP (3GP-DASH) (Release 10), Mar. 2011, 72 pgs.

"OpenDML AVI File Format Extensions", XP002179318,Retrieved from the Internet: URL:http://www.rahul.net/jfm/odmlff2.pdf [retrieved on Oct. 4, 2001], Sep. 1997, 42 pgs.

"Adaptive Streaming Comparison", Jan. 28, 2010, 5 pgs.

"AVI", OpenNET, Mar. 5, 2003, available at https://web.archive.org/web/20030305042201/http://www.opennet.ru/docs/formats/avi.txt 21 pgs.

"AVI files and common problems", virtualdub.org, Current version: v1.10.4Nov. 11, 2004, Retrieved from: http://www.virtualdub.org/blog/pivot/entry.php?id=25, 14 pgs.

"Best Practices for Multi-Device Transcoding", Kaltura Open Source Video, Printed on Nov. 27, 2013 from knowledge.kaltura.com/best-practices-multi-device-transcoding, 13 pgs.

"Container format (digital)", printed Aug. 22, 2009 from http://en.wikipedia.org/wiki/Container_format_(digital), 4 pgs.

"DCMI Metadata Terms: A complete historical record", Dublin Core Metadata Initiative, Dec. 18, 2006, showing Term name: title, version 004, Date modified Oct. 14, 2002, available at http://dublincore.org/usage/terms/history/#title-004, 99 pgs.

"Draft CR: Trick Mode for HTTP Streaming", 3GPP TSG-SA4 Meeting #58, Apr. 26-30, 2010, Vancouver, Canada, S4-100237, 3 pgs.

"DVD—MPeg differences", printed Jul. 2, 2009 from http://dvd.sourceforge.net/dvdinfo/dvdmpeg.html, 1 page.

"DVD subtitles", sam.zoy.org/writings/dvd/subtitles, dated Jan. 9, 2001, printed Jul. 2, 2009, 4 pgs.

"Final Committee Draft of MPEG-4 streaming text format", International Organisation for Standardisation, Feb. 2004, 22 pgs.

"Information Technology—Coding of audio-visual objects—Part 17: Streaming text", International Organisation for Standardisation, Feb. 2004, 22 pgs.

"Information technology—Coding of audio-visual objects—Part 18: Font compression and streaming", ISO/IEC 14496-18, First edition Jul. 1, 2004, 26 pgs.

"Innovation of technology arrived", I-O Data, Nov. 2004, Retrieved from http://www.iodata.com/catalogs/AVLP2DVDLA_Flyer200505.pdf on May 30, 2013, 2 pgs., I-O Data, 2 pgs.

"ISO/IEC 8859-1", Wkipedia, Last updated Aug. 8, 2017, Retrieved from: https://en.wikipedia.org/wiki/ISO/IEC_8859-1, 8 pgs.

"KISS Players, KISS DP-500", retrieved from http://www.kiss-technology.com/?p=dp500 on May 4, 2007, 1 page.

"Multimedia Programming Interface and Data Specifications 1.0", IBM Corporation and Microsoft Corporation, Ch. 2 (RIFF), Aug. 1991, 96 pgs.

"Netflix turns on subtitles for PC, Mac streaming", Yahoo! News, Apr. 21, 2010, Printed on Mar. 26, 2014, 3 pgs.

"OpenDML AVI File Format Extensions", Version 1.02, OpenDML AVI M-JPEG File Format Subcommittee, retrieved from www.the-labs.com/Video/odmlff2-avidef.pdf, Sep. 1997, 42 pgs.

"QCast Tuner for PS2", printed May 11, 2009 from http://web.archive.org/web/20030210120605/www.divx.com/software/detail.php?ie=39, 2 pgs.

"Smooth Streaming Client", The Official Microsoft IIS Site, Sep. 24, 2010, 4 pgs.

"Supported Media Formats", Supported Media Formats, Android Developers, Printed on Nov. 27, 2013 from developer.android.com/guide/appendix/media-formats.html, 3 pgs.

"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.

"Text of ISO/IEC 14496-18/FDIS, Coding of Moving Pictures and Audio", ITU Study Group 16—Videocoding Experts Group—ISO/

(56) References Cited

OTHER PUBLICATIONS

IEC MPEG & ITU-T VCEG(ISO/IEC JTC1/SC29/WG11 and ITU-T SG16 06), No. N6215, Dec. 2003, 26 pgs.
"Thread: SSME (Smooth Streaming Medial Element) config.xml review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
U.S. Appl. No. 13/224,298, "Final Office Action Received", dated May 19, 2014, 26 pgs.
Adhikari et al., "Unreeling Netflix: Understanding and Improving Multi-CDN Movie Delivery", 2012 Proceedings IEEE InfoCom, Mar. 25-30, 2012, Orlando, Florida, 9 pgs.
Akhshabi et al., "An Experimental Evaluation of Rate-Adaptation Algorithms in Adaptive Streaming over HTTP", MMSys'11, Feb. 23-25, 2011, 12 pgs.
Alvestrand, "Tags for the Identification of Languages", Jan. 2001, Retrieved from: http://www.ietf.org/rfc/rfc3066.txt, 12 pgs.
Anonymous, "Method for the encoding of a compressed video sequence derived from the same video sequence compressed at a different bit rate without loss of data", ip.com, ip.com No. IPCOM000008165D, May 22, 2002, 9 pgs.
Blasiak, "Video Transrating and Transcoding: Overview of Video Transrating and Transcoding Technologies", Ingenient Technologies, TI Developer Conference, Aug. 6-8, 2002, 22 pgs.
Bloom et al., "Copy Protection for DVD Video", Proceedings of the IEEE, vol. 87, No. 7, Jul. 1999, 10 pgs.
Bochicchio et al., "X-Presenter: a tool for video-based hypermedia applications", AVI '04 Proceedings of the Working Conference on Advanced Visual Interfaces, May 28, 2004, XP002733976, Association for Computing Machinery USA, DOI: 10.1145/989863.989945, 4 pgs.
Casares et al., "Simplifying Video Editing Using Metadata", DIS2002, 2002, 10 pgs.
Concolato et al., "Live HTTP Streaming of Video and Subtitles within a Browser", MMSys 2013, Feb. 26-Mar. 1, 2013, Oslo, Norway, 5 pgs.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Eskicioglu et al., "An Integrated Approach to Encrypting Scalable Video", Proceedings IEEE International Conference on Multimedia and Expo, Aug. 26-29, 2002, Lausanne, Switzerland, 4 pgs.
Fan et al., "Class View: Hierarchical Video Shot Classification, Indexing, and Accessing", IEEE Transactions on Multimedia, IEEE Service Center, Piscataway, NJ, US, vol. 6, No. 1, Feb. 1, 2004, XP011105807, ISSN: 1520-9210, DOI: 10.1I09/TMM.2003.8195, 18 pgs.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 2010, 3 pgs.
Declaration of Dr. Clifford Reader, Inter Partes Review of U.S. Pat. No. 8,472,792, IPR filed Mar. 6, 2020, 205 pgs.
Declaration of Dr. Sylvia D. Hall-Ellis, Case No. IPR2020-00646, U.S. Pat. No. 8,472,792, IPR filed Mar. 6, 2020, 33 pgs.
First Amended Complaint for Patent Infringement, *DivX, LLC* v. *Netflix, Inc.*, No. 2:19-cv-1602-PSG, Am. Compl. (C.D. Cal Aug. 21, 2019), IPR filed Mar. 6, 2020, 229 pgs.
Patent Assignment Conveying U.S. Pat. No. 7,212,726 to Hulu, LLC, Recorded Jun. 17, 2016, 8 pgs.
Petition for Inter Partes Review of U.S. Pat. No. 8,472,792, IPR2020-00646, IPR filed Mar. 6, 2020, 90 pgs.
Power of Attorney—Hulu, LLC (IPR2020-00646), IPR filed Mar. 6, 2020, 4 pgs.
Power of Attorney—Netflix, Inc. (IPR2020-00646), IPR filed Mar. 6, 2020, 4 pgs.
Prosecution File History for U.S. Pat. No. 8,472,792, IPR filed Mar. 6, 2020, 1450 pgs (presented in 22 parts).
Sony U.S. Appl. No. 60/409,675, filed Sep. 9, 2002, 144 pgs.
Legault et al., Professional Video Under 32-bit Windows Operating Systems, SMPTE Journal, vol. 105, No. 12 (Dec. 1996), 10 pgs.
Defendant Hulu, LLC's Invalidity Contentions for U.S. Pat. Nos. 7,295,673; 8,139,651; 8,472,792; 9,270,720; 9,998,515; 10,212,486; 10,225,588, *DIVX, LLC* v. *Hulu, LLC*, Case No. 2:19-cv-1606-PSG-DFMx, C.D. Cal., Apr. 2, 2020, 136 pgs.
Defendant Netflix, Inc.'s Invalidity Contentions for U.S. Pat. Nos. 7,295,673; 8,139,651; 8,472,792; 9,270,720; 9,998,515; 10,212,486; 10,225,588; 9,184,920, *DIVX, LLLC* v. *Netflix, Inc.*, Case No. 2:19-cv-1602-PSG-DFM, C.D. Cal., Apr. 2, 2020, 148 pgs.
Patent Owner's Preliminary Response to Petition for Inter Partes Review of U.S. Pat. No. 8,472,792, Case No. IPR2020-00646, filed Jun. 17, 2020, 40 pgs.
Petitioners' Reply to Patent Owner's Preliminary Response, Case No. IPR2020-00646, U.S. Pat. No. 8,472,792, filed Jul. 8, 2020, 13 pgs.
Decision Granting Institution of Inter Partes Review for U.S. Pat. No. 8,472,792, Case No. IPR2020-00646, Sep. 15, 2020, 57 pgs.
Patent Owner's Preliminary Surreply to Petition for Inter Partes Review, Case No. IPR2020-00646, U.S. Pat. No. 8,472,792, filed Jul. 15, 2020, 14 pgs.
United States Patent and Trademark Office, in re Campana, Jr., et al., Control Nos. 90/006,494, 90/006,681, 90/007,726, Decision Denying Petition, Feb. 22, 2007, 11 pgs.
Trott et al., "File format provides a useful tool to multimedia authors", Infoworld, Apr. 13, 1998, 1 page.

\* cited by examiner

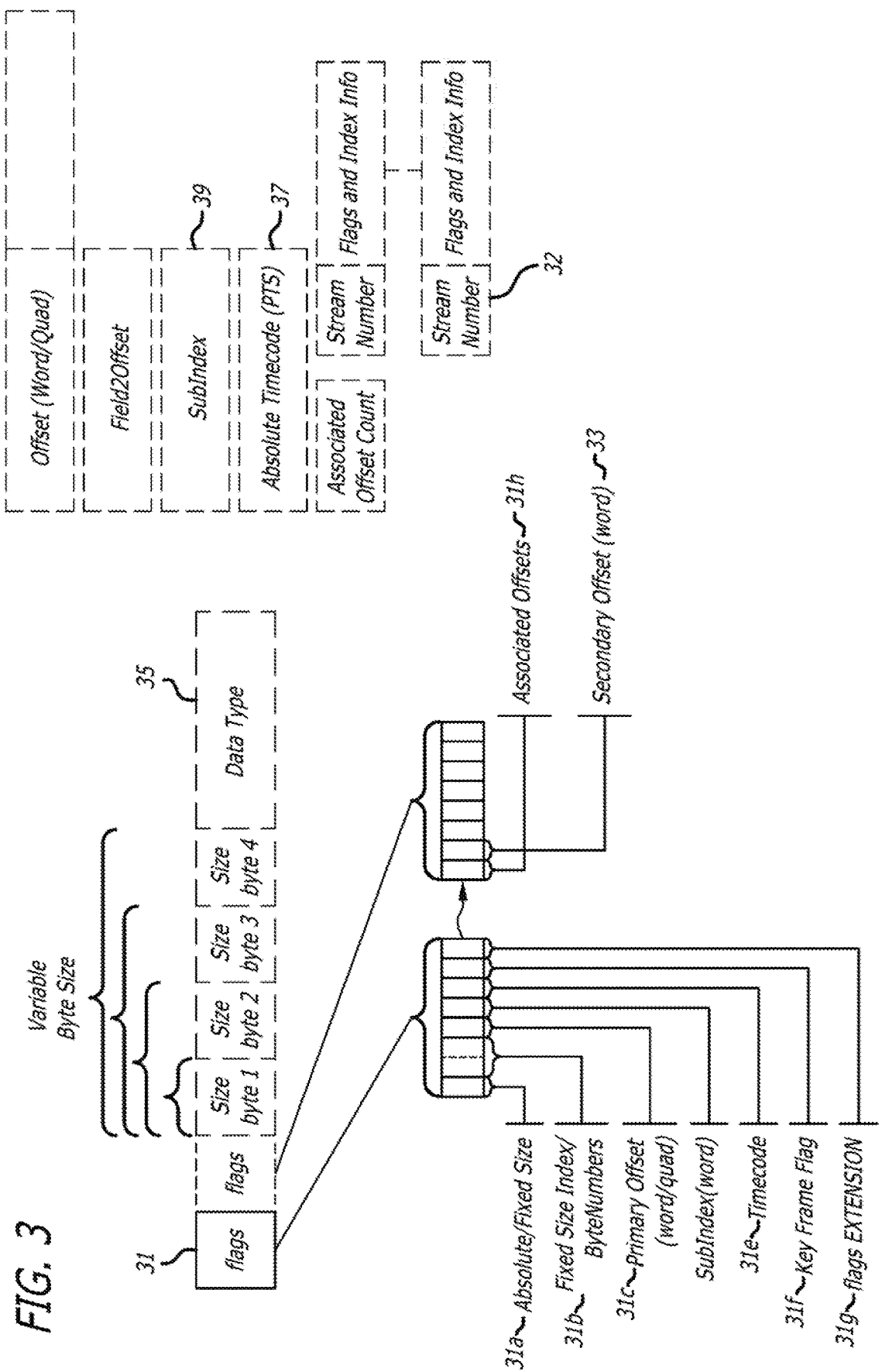

SYSTEMS AND METHODS FOR PLAYING BACK MULTIMEDIA FILES INCORPORATING REDUCED INDEX STRUCTURES

CROSS-REFERENCE TO RELATED APPLICATIONS

This application is a continuation of U.S. patent application Ser. No. 15/229,030, entitled "Hierarchical and Reduced Index Structures for Multimedia Files" to Soroushian et al., filed Aug. 4, 2016, which is a continuation of U.S. patent application Ser. No. 13/560,884, entitled "Hierarchical and Reduced Index Structures for Multimedia Files" to Soroushian et al., filed Jul. 27, 2012, which is a continuation of U.S. patent application Ser. No. 12/272,631, entitled "Hierarchical and Reduced Index Structures for Multimedia Files" to Soroushian et al., filed Nov. 17, 2008 and which issued on Jul. 31, 2012 as U.S. Pat. No. 8,233,768, which application claims priority under 35 U.S.C. § 119(e) to U.S. Provisional Application No. 60/988,513, entitled "Hierarchical and Reduced Index Structures for Multimedia Files" to Soroushian et al., filed Nov. 16, 2007. The disclosures of application Ser. Nos. 15/229,030, 13/560,884, 12/272,631, and 60/988,513 are incorporated by reference in their entirety.

BACKGROUND

The present invention relates generally to multimedia files and more specifically to the indexing of information within a multimedia file.

In recent years, the playback of multimedia files has become an integrated part of the average consumer's daily life. Cellular telephones, DVD players, personal computers, and portable media players are all examples of devices that are capable of playing a variety of multimedia files. While each device may be tailored to a particular multimedia format, the extensive proliferation of these devices encourages a certain level of interoperability amongst the different device classes and categories. Likewise, there are certain features such as fast-forward, reverse, start, stop, play, and pause which are expected to behave similarly across all device categories, despite their performance capabilities and use-case application.

One of the most common features of media playback devices is the support for random access, fast-forward and reverse playback of a multimedia file, which is sometimes referred to as "trick play". Performing trick play functionality generally requires displaying the video presentation at a higher speed in forward and reverse direction, and resuming the overall presentation from a position close to where the viewer terminated the video trick play activity. The audio, subtitle, and other elements of the presentation are typically not used during trick play operations, even though that can be subject to a device's operating preference. In accommodating trick play functionality, multimedia files typically contain an index section used to determine the location of all frames, and specifically the video frames which can be independently decoded and presented to the viewer. When all index information is stored in a single location within a file and linearly references the multimedia information within the file, a player must seek to a specific index entry in order to be able to play a file. For example, a player that is instructed to play a multimedia presentation at the half-way point of the presentation typically processes the first half of the index data before being able to determine the set of data points required to commence playing.

The index section has many other potential applications as well: it may be a necessary element in basic playback of multimedia files that exhibit poor multiplexing characteristics; the index section may also be used to skip over non-essential information in the file; also, an index is often required for the resumption of playback after the termination of trick play functions.

SUMMARY

Embodiments of the invention utilize indexes that can increase the efficiency with which a player can perform a variety of functions including trick play functions. In several embodiments, the index is a hierarchical index. In many embodiments, the index is a reduced index and, in a number of embodiments, the index is expressed using bit field flags and associated data fields.

BRIEF DESCRIPTION OF THE DRAWINGS

FIG. 3 is a graphical representation of index structure detailing bit flags and associated data filed within a multimedia file in accordance with an embodiment of the invention.

DETAILED DESCRIPTION

Turning now to the drawings, multimedia files including indexes in accordance with embodiments of the invention are described. In a number of embodiments, the index is a hierarchical index. A hierarchical index is a representation of index information in a form that provides a coarse index to a few predetermined locations within the multimedia file followed by a further refined representation of the portions of the multimedia file. In many embodiments, the lowest level of the index is sufficiently granular as to identify every frame in the multimedia file. When a hierarchical index is used, a player need only request a small amount of relevant index information in order to commence playing a multimedia file. As such, the hierarchical index lowers the memory footprint needed by playback devices to effectively seek and perform trick-play operations on a multimedia file. Additionally, file load times for playback are reduced and trick-track load performance enhanced. In one embodiment, the hierarchical index has index information that includes offsets into cue points within a multimedia file with timestamps allows lookups to be fast and efficient.

In several embodiments, the multimedia file includes a reduced index. Players in accordance with embodiments of the invention can utilize a reduced index to rapidly move between accesses or key-frames when performing trick play functions. The reduced index can be in conjunction with a hierarchical index. However, reduced indexes can be included in multimedia files that do not include a hierarchical index. A reduced index only provides the location of the accesses or key-frames within a multimedia file, along with a time-stamp value to indicate their corresponding time within the multimedia presentation. In a number of embodiments, bit field flags and associated data fields are used to represent index information. Such a representation can be used in accordance with embodiments of the invention to express index information, a hierarchical index and/or a reduced index.

Hierarchical Indexes

Figure 1:
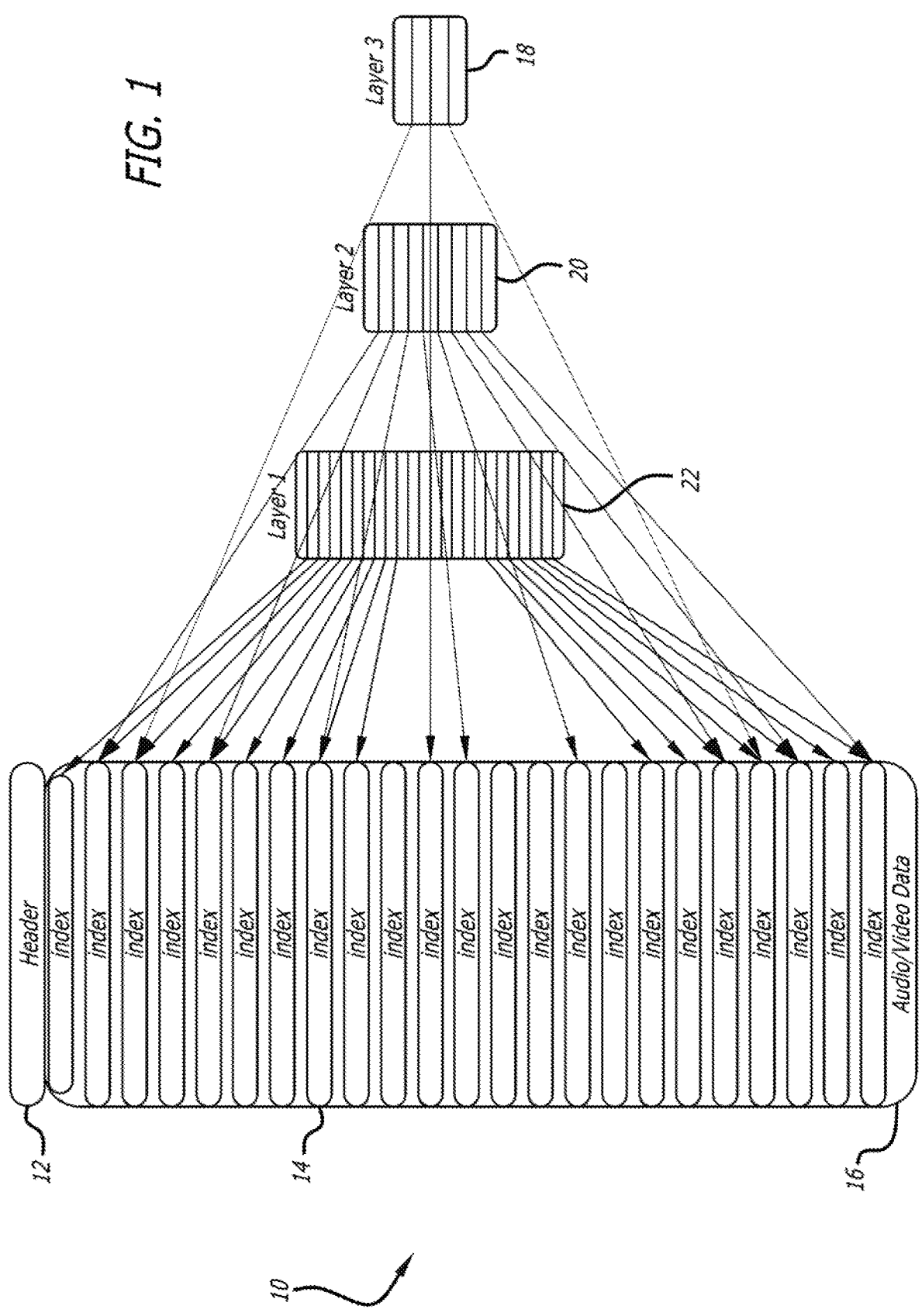
FIG. 1 is a graphical representation of an index structure within a multimedia file in accordance with an embodiment of the invention.

A multimedia file containing a hierarchical index in accordance with an embodiment of the invention is shown in FIG. 1. The multimedia file 10 includes header information 12, index information 14 interleaved amongst audio/video data 16 and a three layer hierarchical index. The coarsest layer 18 of the hierarchical index includes a small number of references to pieces of index information. The middle layer 20 and the finest layer 22 each include successively larger numbers of references to index information.

In many embodiments, the index information 14 interleaved amongst the audio/video data 16 lists the location of encapsulated audio, video, subtitle, and/or other similar data. Typically, each block of interleaved index information lists the encapsulated media immediately following the block of interleaved index information. In several embodiments, the index information 14 contains information that describes the absolute or relative location of the start of each piece of encapsulated media. In a number of embodiments, the interleaved index information 14 includes the size of each indexed piece of encapsulated media, in addition to information indicating whether the indexed piece of encapsulated media can be used as an access or key-frame, its presentation time value, and other information, which may be helpful to a decoding device.

Each layer in the hierarchical index includes references to the interleaved index information 14 within the multimedia file 10. The implementation of the hierarchy structure can be inclusive or exclusive, meaning that the data in each layer can be repeated in the other layers or each layer may contain unique position information. In addition, the number of elements at each layer of a hierarchy and the total number of layers can be pre-determined, limited based on pre-determined values, or unbounded.

Figure 2B:
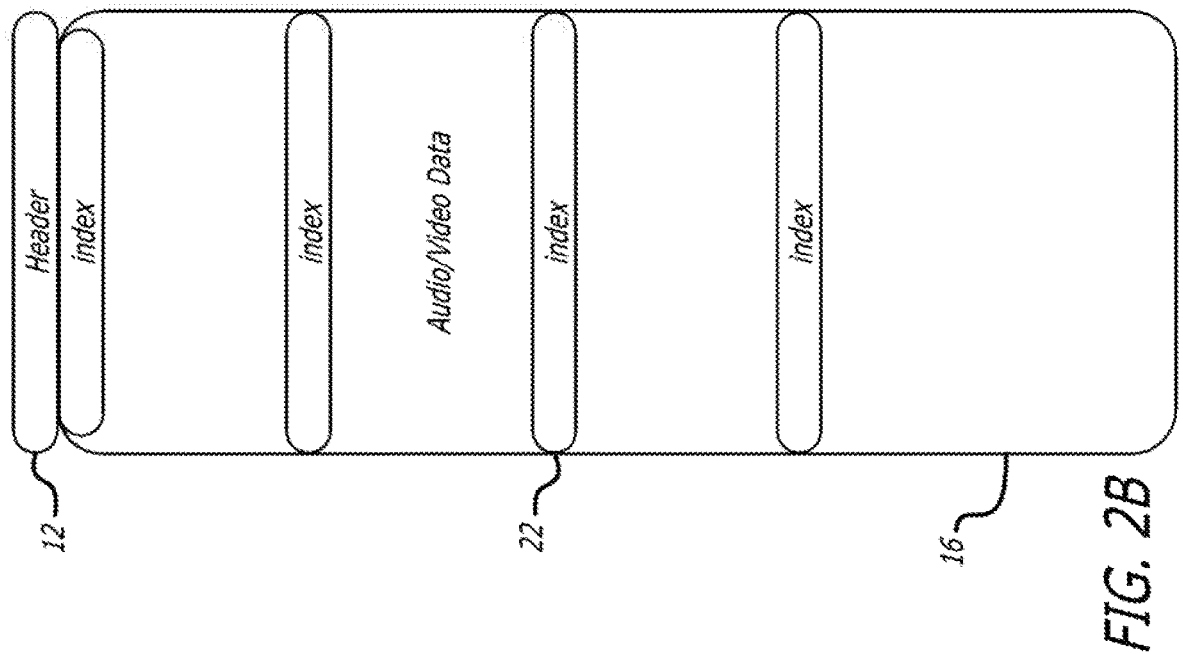
FIG. 2B is a graphical representation of an index structure interleaved within the audio/video data of a multimedia file in accordance with another embodiment of the invention.
Figure 2A:
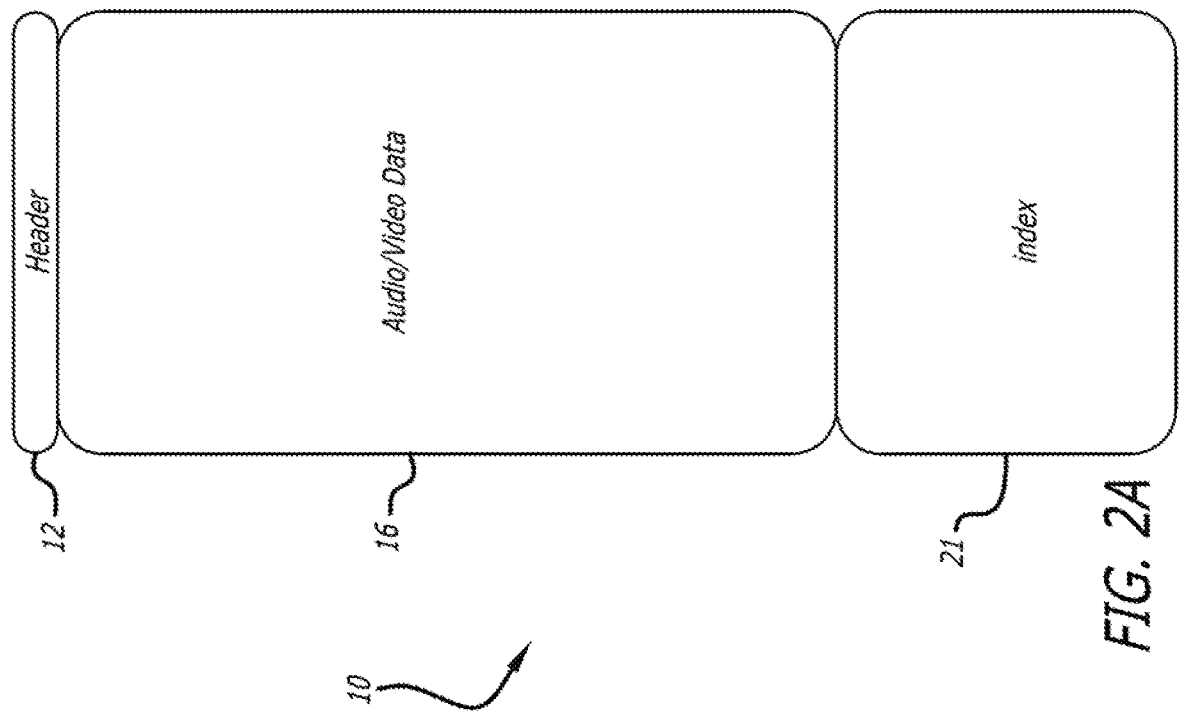
FIG. 2A is a graphical representation of an index structure following the audio/video data of a multimedia file in accordance with an embodiment of the invention.

Although a specific implementation of a hierarchical index is shown in FIG. 1, hierarchical indexes can be implemented in many different ways. For example, the index values can be stored in a single part of the file, or distributed in clusters in the file. Multimedia files containing different distributions of index information in accordance with embodiments of the invention are shown in FIGS. 2A-B. For example, the index information could be appended or prepended to the audio/video data portion 16 of the multimedia file 10 as an entire unit 21. Index clusters 22 shown in FIG. 2B can also be woven into the audio/video data portion. In addition to distributing index information in different ways, the hierarchy itself can be implemented as a structure that points to the actual frames in a file (as opposed to blocks of index information), which may or may not start with access or key-frame positions.

Figure 2C:
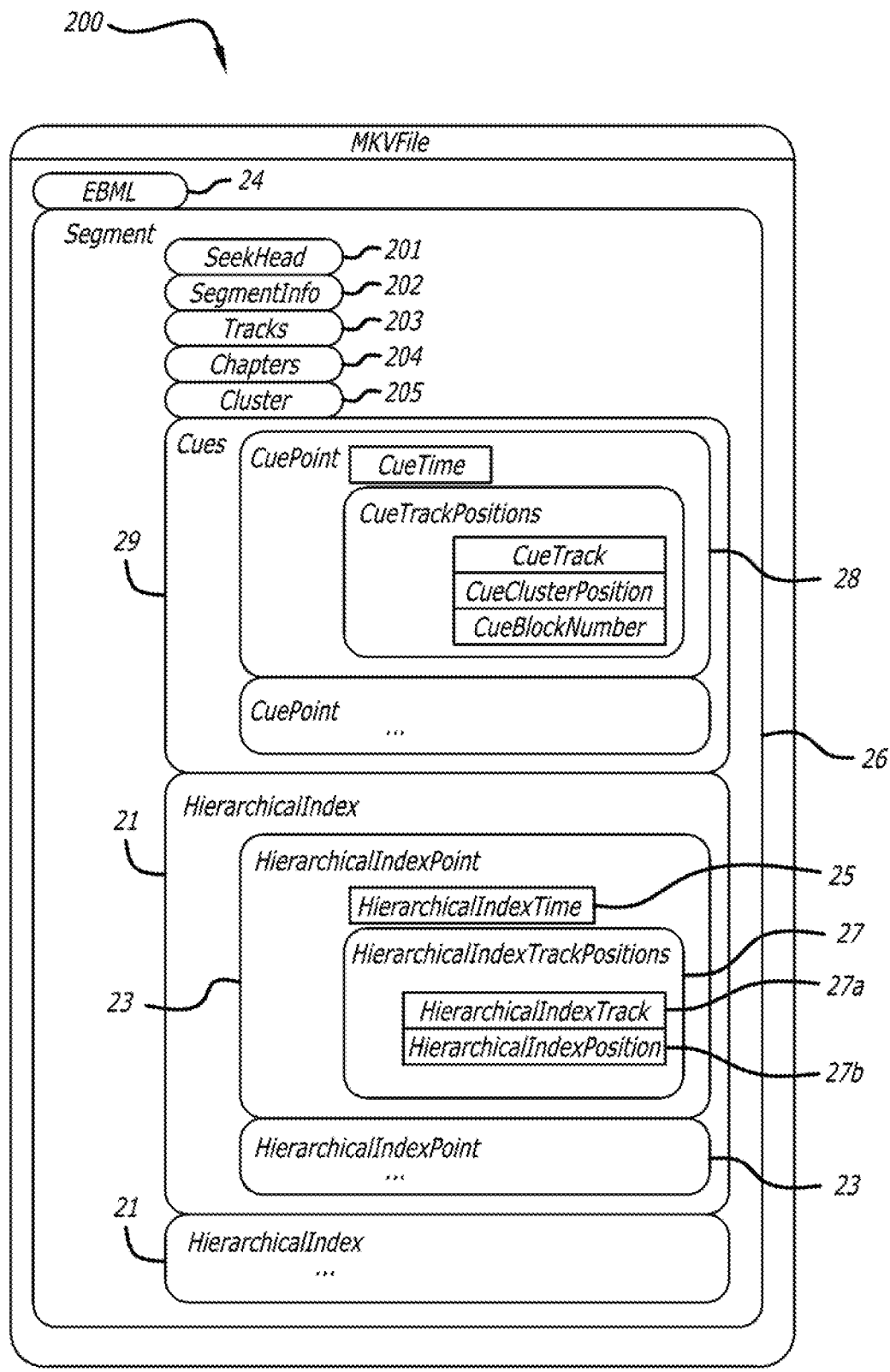
FIG. 2C is a detailed graphical representation of an index structure relative to other portions of a multimedia file in accordance with an embodiment of the invention.
Figure 2D:
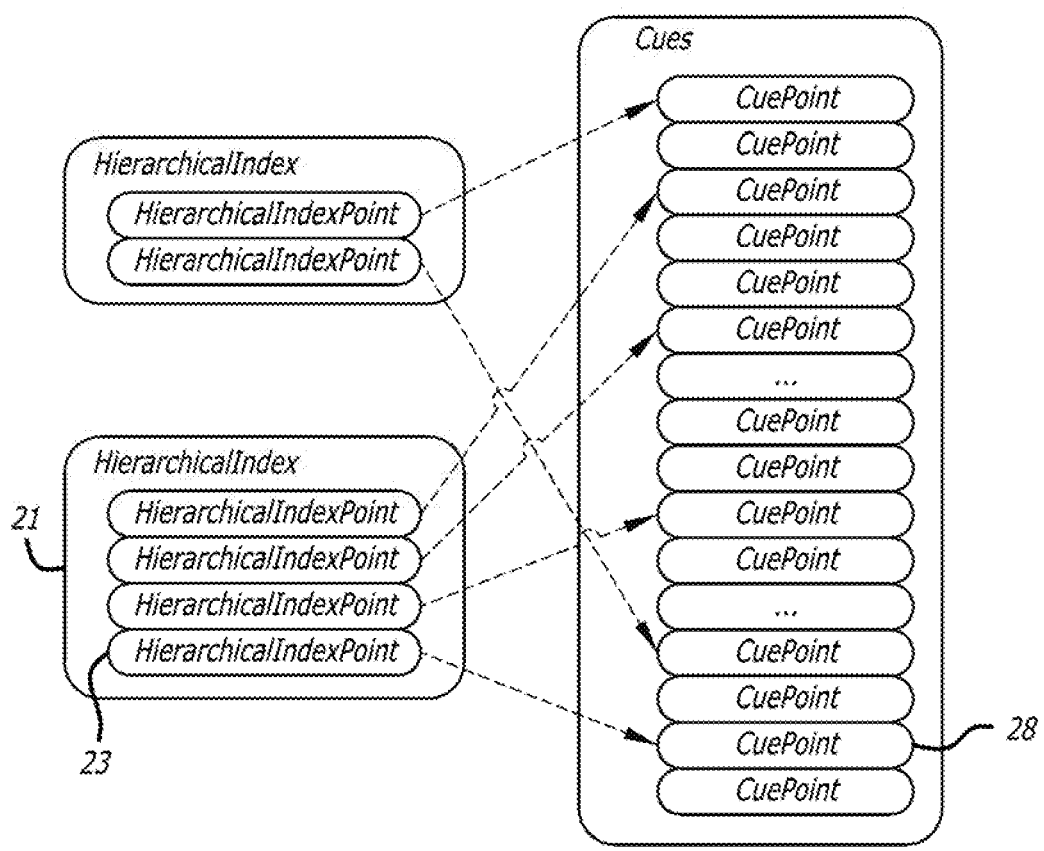
FIG. 2D is a graphical representation of an index structure relative to cue data of a multimedia file in accordance with an embodiment of the invention.

FIG. 2C further details the hierarchical index 21 within a larger hypothetical file structure MKV file 200. This file structure is made of two primary sections, the EBML 24 and the Segment 26. In this file structure, the Segment may host the Seek Head 201, Segment Info 202, Tracks 203, Chapters 204, Cluster 205, Cues 29, and a Hierarchical Index 21. As shown, a plurality of hierarchical indexes 21 could be included with the multimedia file. Additionally, each hierarchical index can include multiple hierarchical index points 23. These index points in various embodiments have a timestamp 25 and a track position 27, specifying a specific media track 27a and a position or offset 27b from the timestamp 25. Cues 29 are also shown and as will be explained in more detail below are utilized by the index points 23 to increase access to specific points within a multimedia file. This dynamic structure for example is shown in FIG. 2D where multiple hierarchical index points 23 reference or point to multiple cue points 28. In various embodiments, the hierarchical index contains references to a fraction, e.g., one tenth, of cue points relative to the total number of cue points in a media file. One would appreciate that the references can increase to increase the granularity of pointers or references to the cue points.

A player attempting to decode a multimedia file that includes a hierarchical index in accordance with an embodiment of the invention typically uses the hierarchical index as necessitated by the functions the player is requested to perform. When trick play functions are requested, the player can locate an index in the hierarchy corresponding to a specific speed and decode each of the frames indicated by the index. The manner in which a specific frame is located using the index depends upon the nature of the index. In embodiments where each index in the hierarchy points directly to video frames, then the process is simple. In embodiments where the index points to additional index information within the multimedia file, the additional index information is accessed and used to locate a desired frame.

Reduced Indexes

Many multimedia files in accordance with embodiments of the invention use reduced index information. Reduced indexes can be used in conjunction with a hierarchical index or in multimedia files that do not include a hierarchical index. A reduced index does not include information concerning every piece of multimedia information within a multimedia file. A reduced index typically is restricted to information concerning the location of access or key-frames and the time stamp of the access or key-frames. Access frames are generally video frames that can be independently decoded, although the reduced index can be used to point to any other type of key-frame for other streams stored in the multimedia file. The reduced index can enable a player to rapidly skip between key frames when performing trick play functions.

In a number of embodiments, a reduced index is only provided for a single or primary data type and offsets are provided for each of the other streams of data contained within the file which may be related to the primary data type. The offsets can be used by a player to facilitate synchronized playback of different media. In several embodiments, each piece of index information also includes the size of the access or key-frame and the data-type of the access or key-frame. A player decoding a multimedia file that contains a reduced index in accordance with an embodiment of the invention can use the reduced index to perform trick play functions in a similar fashion to the way in which a player uses a hierarchical index. The player can sequence through the reduced index inspecting the Timestamps of access or key frames to ascertain which frames to render in order to achieve a desired speed.

Expressing Index Information Using Bit Fields

Multimedia files in accordance with a number of embodiments of the invention utilize bit field flags and associated data fields to express index information. In many embodiments, the bit field flags are used to signal the presence of a set of corresponding variable length data fields that contain index information. Bit field flags 31 and data fields 32 that can be used to express index information concerning a piece of multimedia information in accordance with an embodiment of the invention are shown in FIG. 3. In the illustrated embodiment, a set of bit-field flags signals the presence of additional data following the flags. The bit-field flags are specified as 8-bits in their entirety, but that is not necessarily a requirement for other implementations. The first bit of the flag may indicate an Absolute/Fixed Size field 31*a*, which determines whether the size of the frame is read from a pre-determined set of sizes stored in a separate section of the file, or whether they are available as a series of bytes following the flags field. Two additional bits, Fixed Size Index/Byte Numbers field 31*b*, are used to determine the index-position of the size value or the total number of bytes used to represent the value, depending on the setting of the Absolute/Fixed Size bit or field 31*a*. The next bit, a Primary Offset field 31*c*, determines the size of the offset value, which may be the location of the frame. This bit is selected amongst two pre-determined byte numbers, for example either a 4-byte value or 8-byte value. Likewise, a flag may indicate the presence of another predetermined offset, e.g., a Secondary Offset 33, which can be 4 bytes and represents a relative offset from the Primary Offset value. A bit 31*e* indicating the presence of a timecode byte sequence may also be present, along with another bit, Key Frame Flag bit 31*f*, which can be used to determine the presence of access or key frames. In many embodiments, bit field flags and data fields similar to those shown in FIG. 3 are used to index the location of all frames in a multimedia file.

The number of flags that can be represented via the structure shown in FIG. 3 is infinitely extensible using a "Flags Extension" bit 31*g* which signals the presence of a follow-on flag. Here, one bit 31*h* may be referred to as "Associated Offsets". Associated offsets may then signal the presence of a byte value, which is used to determine the number of streams which correspond to the current frame. These relative offsets may use the same flag and subsequent index information for other frames in the stream, to be used for synchronization purposes. The frames identified by the relative offsets, when played back correctly, may provide a synchronized presentation of audio, video, subtitles, and other related data. The stream number value 32 often corresponds to the actual stream numbers stored in the file.

Figure 4:
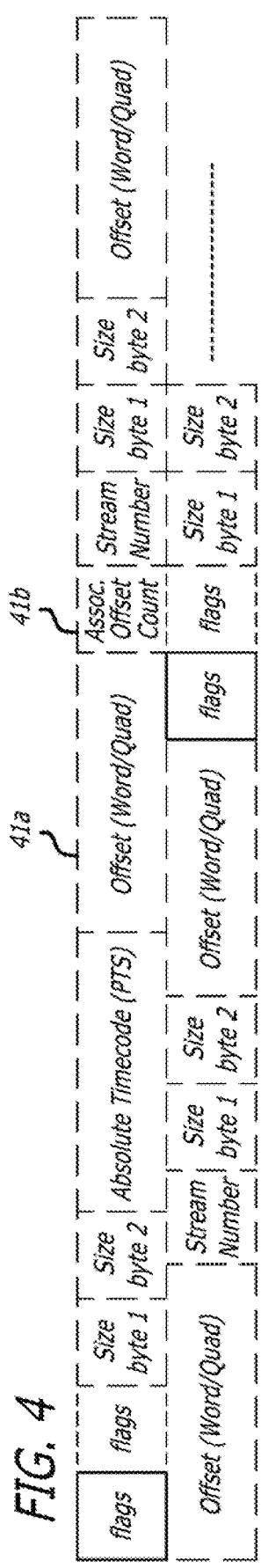
FIG. 4 is a graphical representation of index structure providing time codes and offset data fields within a multimedia file in accordance with an embodiment of the invention.

Index information represented using the two relative offset values 41*a*,*b* is shown in FIG. 4. In many embodiments, the data type for each frame is indicated for an entire group of frames, or alternatively is indicated on a frame-by-frame basis, in which case a "Data Type" field 35 is added to the index-structure. The presence of a Timecode value 37 to indicate the exact time of a frame in an overall presentation may be done via a set of pre-determined specifications. For example, the Timecode value could be required for all video access frames; alternatively, the presence of a Timecode could be mandatory on a periodic basis for audio samples. It is only important to note that the Timecode value is optionally present and is indicated by a corresponding bit-flag.

Figure 5:
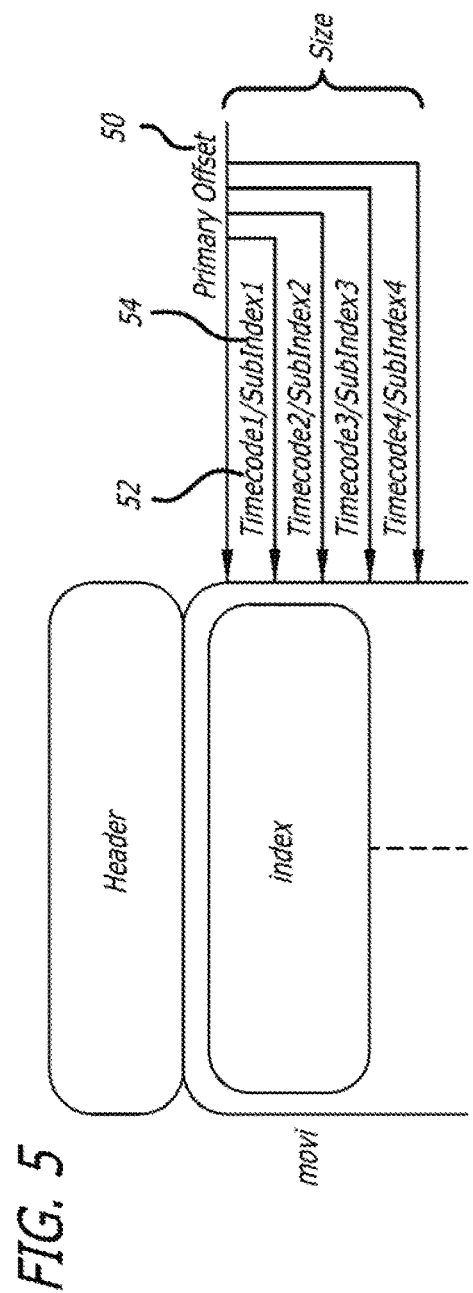
FIG. 5 is a graphical representation of index structure with time codes and multiple offset data fields relative to a size data field within a multimedia file in accordance with an embodiment of the invention.

Through a set of pre-determined rules, structures similar to those described above can be applied for the representation of hierarchical indexing in accordance with embodiments of the invention. For example, the "Primary Offset" value 50 can point to a specific index position, along with the Timecode value 52 indicating the exact time-stamp of the index. An additional bit-field 39, the "Subindex", can point to a relative offset from the position indicated by the "Primary Offset". This "Subindex" position 54 is a refinement from the beginning of a larger index cluster. Use of various values to construct a hierarchical index in accordance with an embodiment of the invention is shown in FIG. 5.

Figure 6:
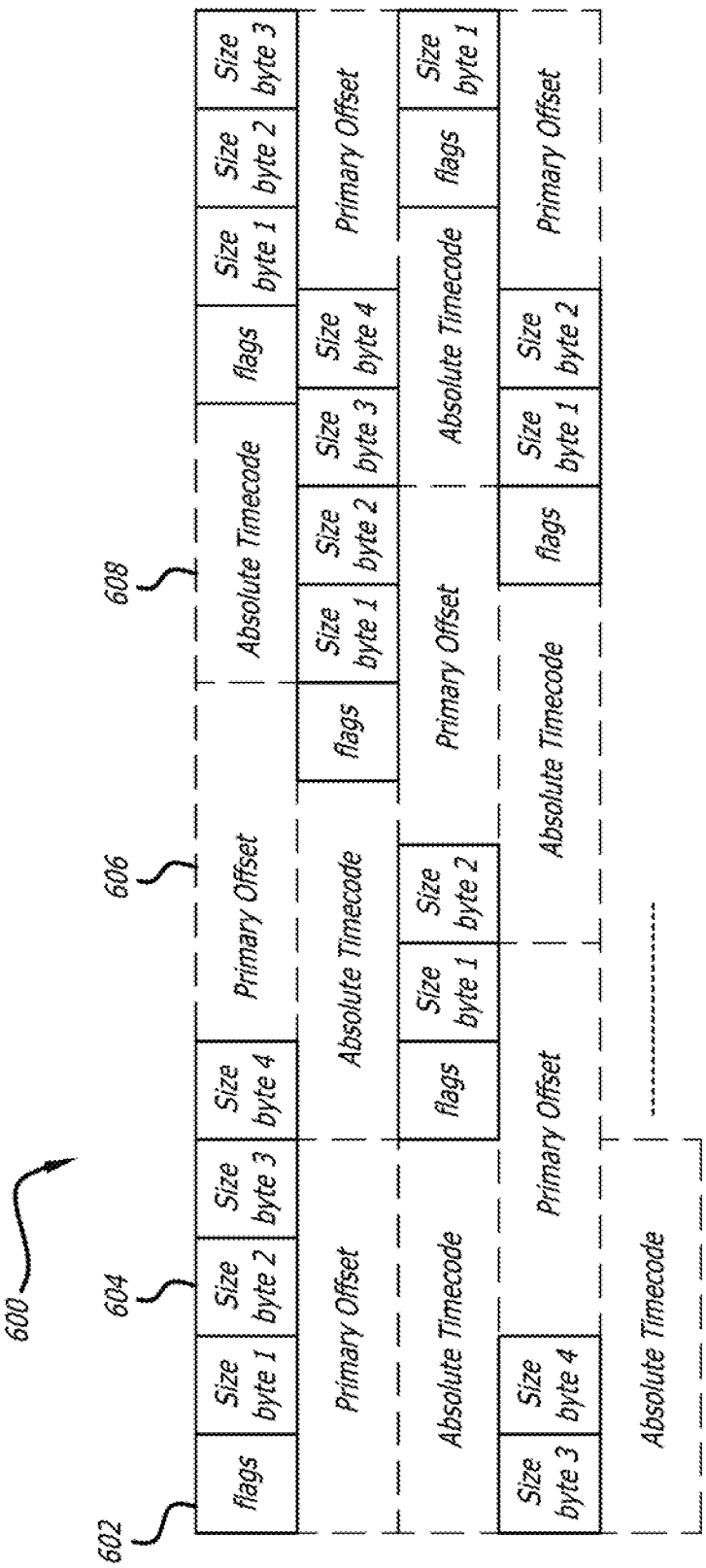
FIG. 6 is a graphical representation of index structure with time codes and primary offset data fields within a multimedia file in accordance with an embodiment of the invention.

Bit field flags and associated data fields can also be used to represent a reduced index structure pointing to a series of access or key frames for a particular stream in a file. A reduced index in accordance with an embodiment of the invention is shown in FIG. 6. In the illustrated embodiment, the "flags" field 602 is followed by a corresponding set of size bytes 604, a "Primary Offset" value 606, and a Timecode 608. The access frames may typically be related to video frames in a file, though again this field could be defined for all stream types in a file. The structure 600 shown in FIG. 6 stores the location of all access or key-frames, and can contain the location of all related offsets for the encapsulated tracks in the file.

It is important to note that the use of flexible bit field flags enables the implementation of multiple data structures which may appear in the hierarchical, reduced, and conventional indexing schemes. The use of bit fields as flags indicating variable length data can help optimize the size of an overall index because not all members are in general required by all frames.

Figure 7:
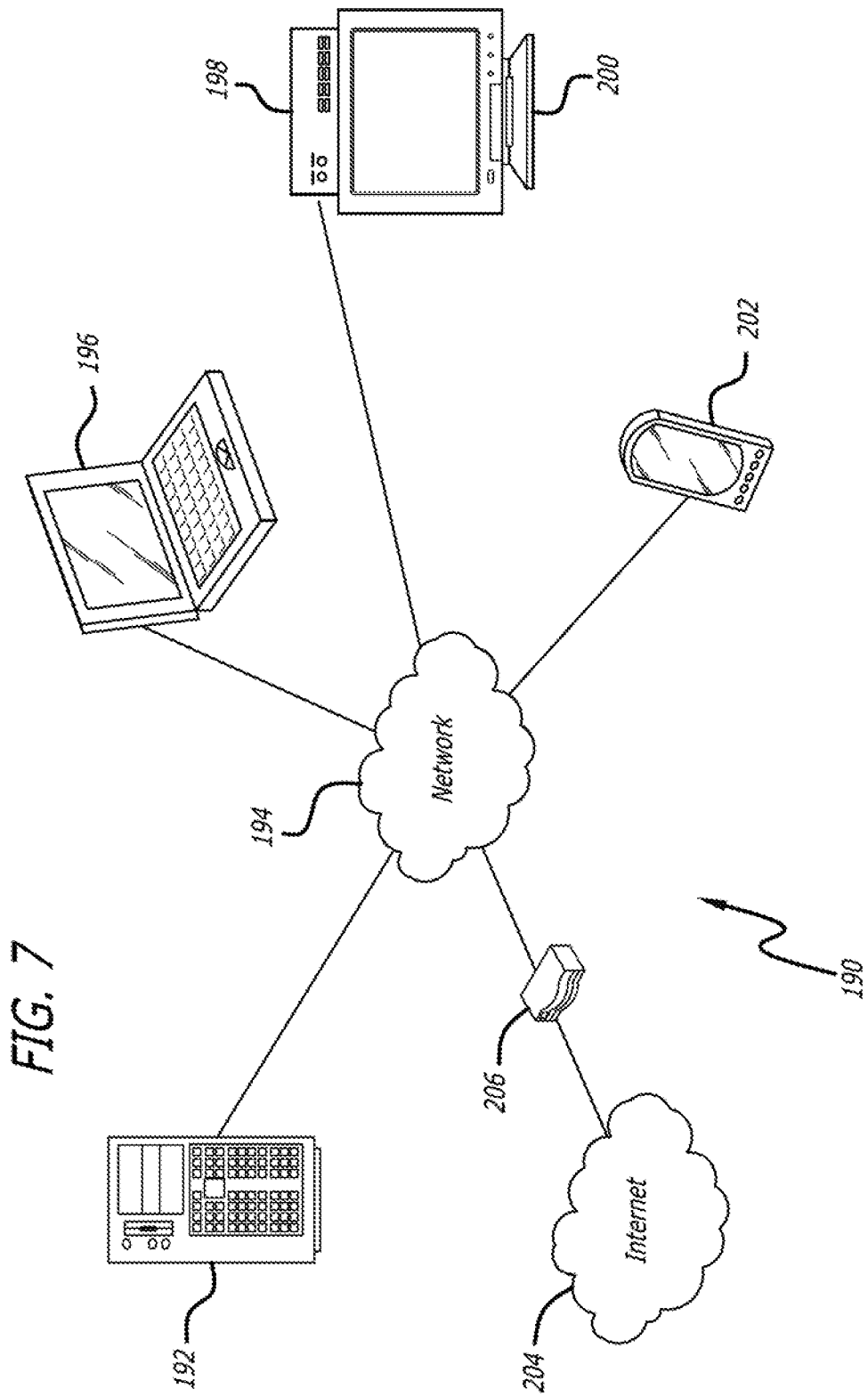
FIG. 7 is a semi-schematic network diagram of playback system for streaming and fixed media file playback in accordance with an embodiment of the invention.
Figure 8:
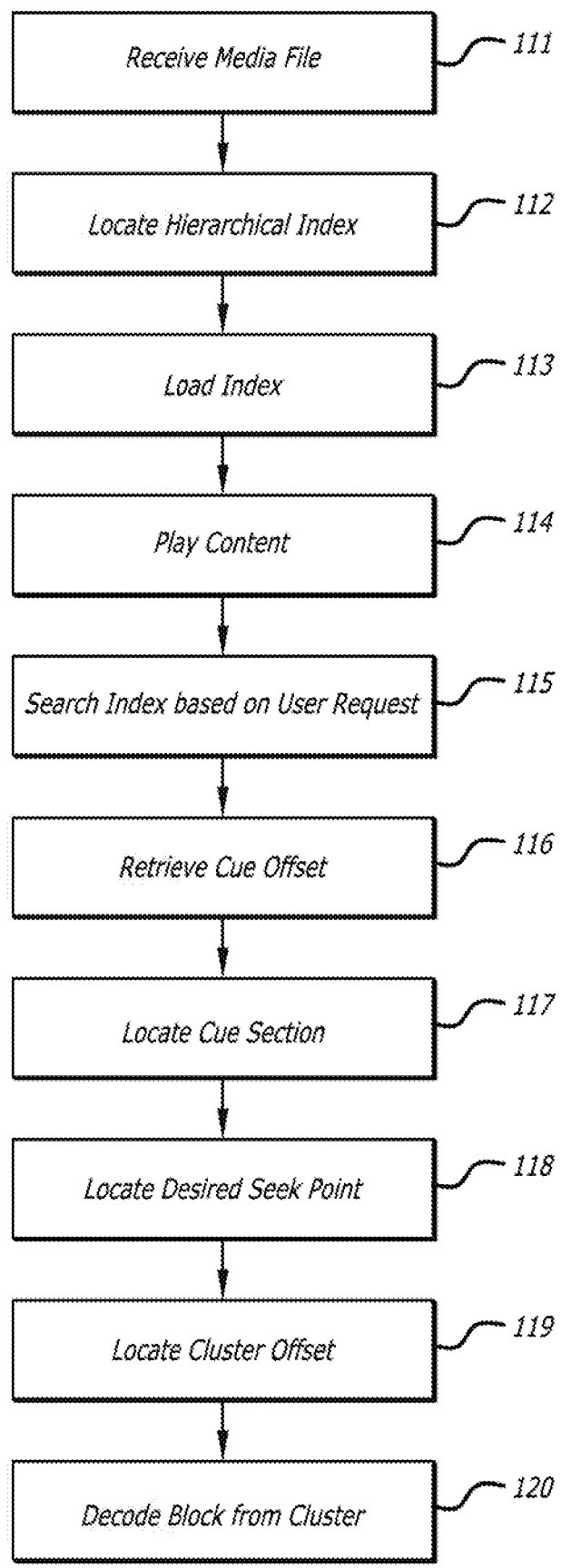
FIG. 8 is a flowchart of a process utilizing index structure within a multimedia file in accordance with an embodiment of the invention.
Figure 9:
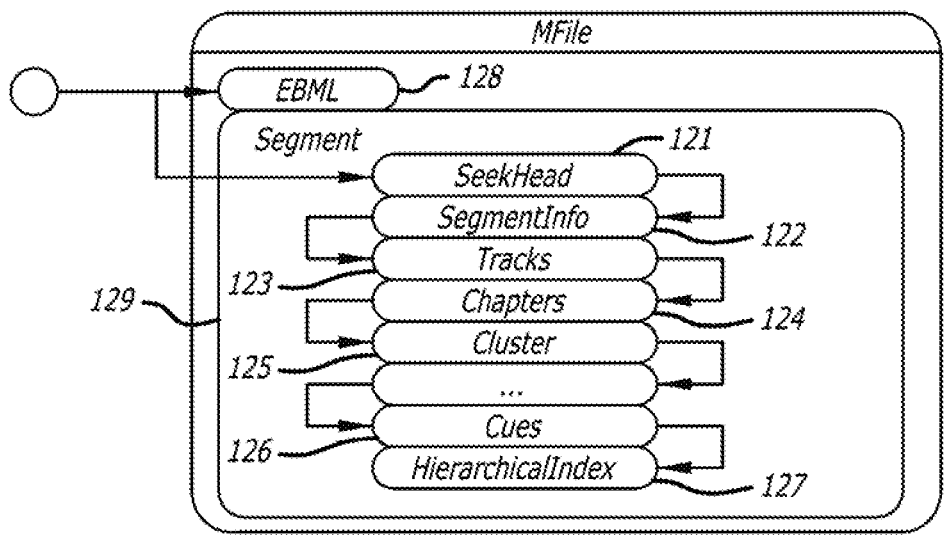
FIG. 9-11 are graphical representations with increasing detail of an index structure within a multimedia file in accordance with one embodiment of the invention and to further illustrate the process of FIG. 8.

Referring now to FIG. 7, a progressive playback system in accordance with an embodiment of the invention is shown. The playback system 190 includes a media server 192 connected to a network 194. Media files are stored on the media server 194 and can be accessed by devices configured with a client application. In the illustrated embodiment, devices that access media files on the media server include a personal computer 196, a consumer electronics device such as a set top box 18 connected to a playback device such as a television 200, and a portable device such as a personal digital assistant 202 or a mobile phone handset. The devices and the media server 192 can communicate over a network 194 that is connected to the Internet 204 via a gateway 206. In other embodiments, the media server 192 and the devices communicate over the Internet.

The devices are configured with client applications that can request portions of media files from the media server 192 for playing. The client application can be implemented in software, in firmware, in hardware or in a combination of the above. In many embodiments, the device plays media from downloaded media files. In several embodiments, the device provides one or more outputs that enable another device to play the media. When the media file includes an index, a device configured with a client application in accordance with an embodiment of the invention can use the index to determine the location of various portions of the media. Therefore, the index can be used to provide a user with "trick play" functions. When a user provides a "trick play" instruction, the device uses the index to determine the portion or portions of the media file that are required in order to execute the "trick play" function and requests those portions from the server. In a number of embodiments, the client application requests portions of the media file using a transport protocol that allows for downloading of specific byte ranges within the media file. One such protocol is the HTTP 1.1 protocol published by The Internet Society or BitTorrent available from www.bittorrent.org. In other embodiments, other protocols and/or mechanisms can be used to obtain specific portions of the media file from the media server.

Referring to FIGS. 8-11, one embodiment of a process of utilizing the index structure is shown. A media file, e.g., MFile 120, is received from, for example, a media server based on a media file request from a playback device or in particular a playback engine of the playback device (111). Upon locating the requested media file, the media server transmits all or some portions at a time of the media file to the playback device. The playback device in one embodiment decodes the transmitted media file to locate the hierarchical index (112). In one such embodiment, referring to FIG. 9, the playback device traverses or parses the file starting from EBML (Extensible Binary Meta Language) element 128, the Segment element 129 and then the contents of the Seek Head 121 to locate the Hierarchical Index 127. As such, the Segment information 122, Tracks 123, Chapters 124, Clusters 125 and Cues 126, although could be also parsed, can be bypassed to quickly locate the Hierarchical Index. The located Index is then loaded into memory (113). Loading the Index into memory facilitates access to locate a desired packet or frame to be displayed or accessed by the playback device.

The Hierarchical Index is small enough for many low memory playback devices, e.g., low level consumer electronic devices, to hold the entire Index in memory and thus avoiding a complex caching scheme. In cases, where the Index is too large to store in memory or generally more feasible, no loss in seek accuracy occurs. With the Index being a lookup table or mechanism into the cues or defined seek points for each of the tracks and not the actual seek points, the dropping of portions of the Index can cause a few additional reads when searching the cues for a desired seek point. The playback device accesses the bit stream packets or frames of the transmitted media file to play the audio, video, and/or subtitles of the media file (114).

Upon a user request, e.g., a trick-play request, the playback device searches the loaded or cached Hierarchical Index to find an entry or hierarchical point equal to or nearest and preceding to the desired time or seek point (115). In one embodiment, the particular hierarchical point is located based on the presentation time or timestamp of the content being played and the user request, e.g., the speed and/or direction of trick-play function. In the illustrated case, FIGS. 10-11, the desired timestamp is 610 seconds within the bit stream.

Figure 10:
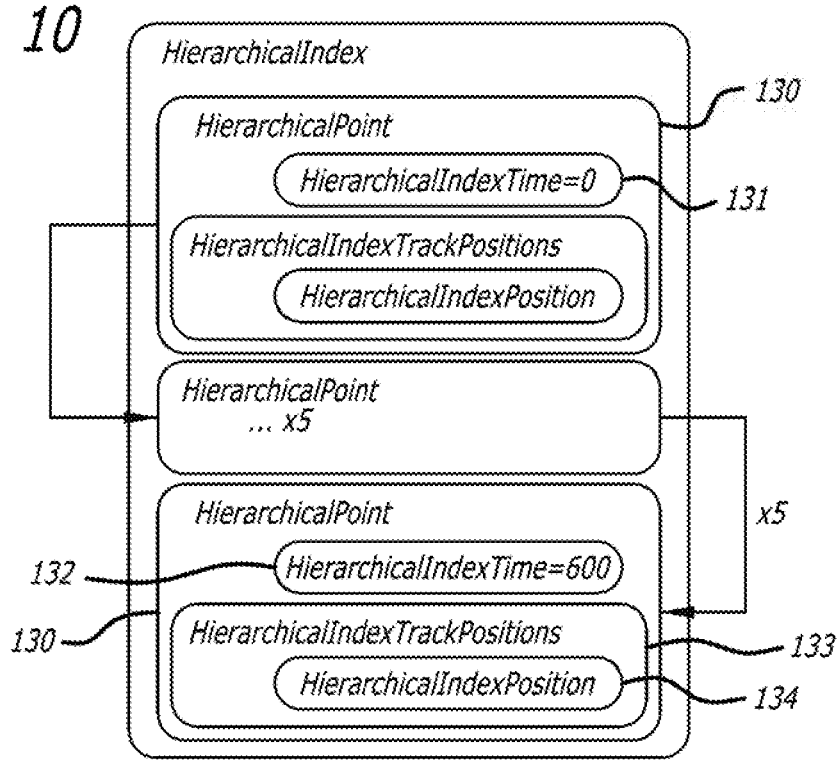

FIG. 10 demonstrates a total of 6 hierarchical access points 130, starting from Index Time zero (Hierarchical Index Time 131) to Index Time 600 (Hierarchical Index Time 132), where five of the Hierarchical Points on this diagram have not been shown. After locating the closest hierarchical point to the desired seek time (in this case Index Time 600), an Index Position or offset 134 is retrieved from Track Position 133 to locate a portion of cues that contains the desired seek point (116). The playback device seeks to the located portions of cues (117) and the cues are read through until an entry equal to, or nearest and preceding to the desired time or seek point is located (118).

Utilizing the located cue, the playback device retrieves an offset value to seek and find the desired cluster (119). A block in the desired cluster that has a corresponding timestamp as the desired timestamp, e.g., 610, is located and decoded (120) for display by the playback device. The process continues until a user request stops playback of the media file.

Figure 11:
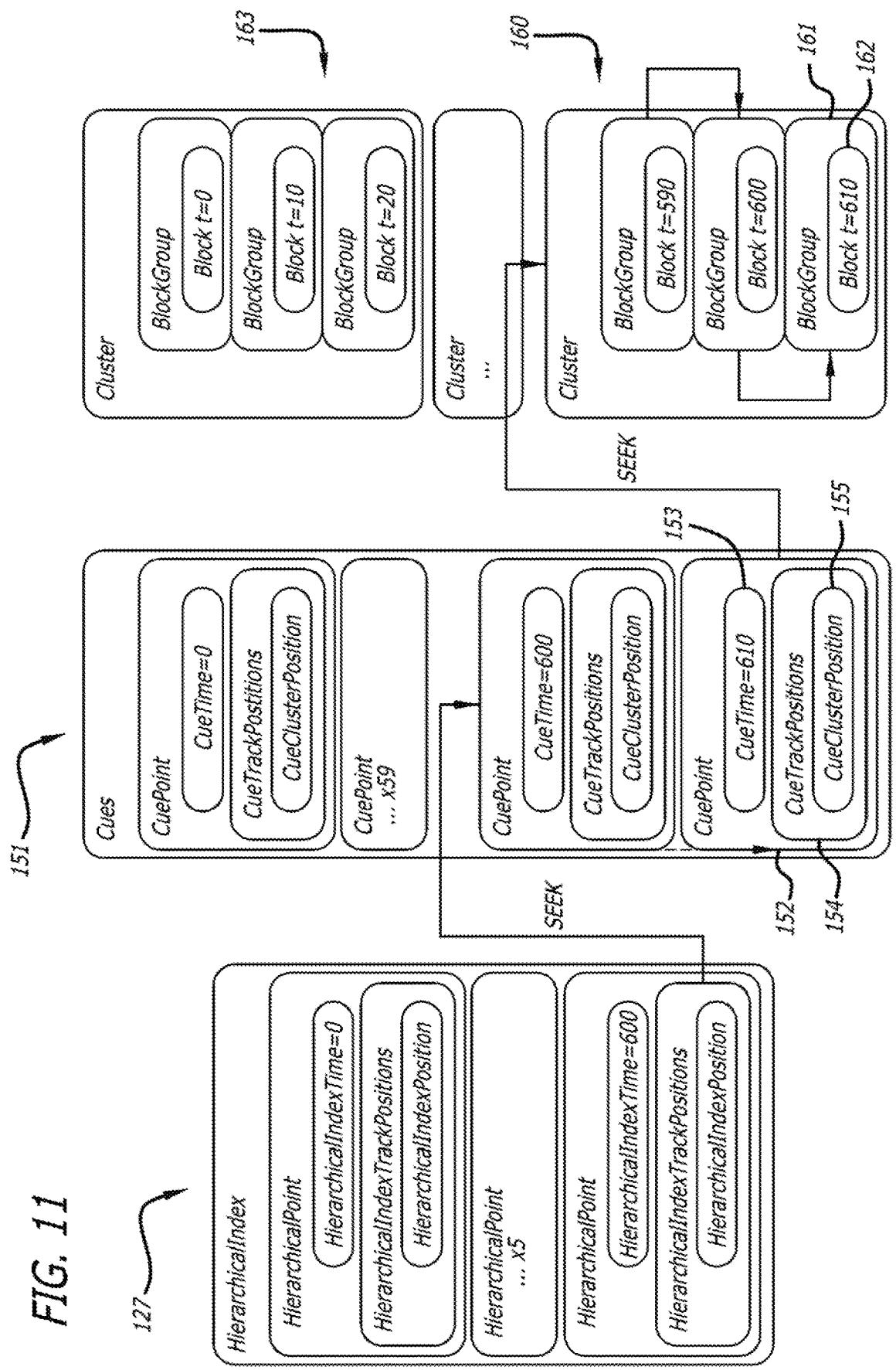

This concept is further clarified in FIG. 11. The Hierarchical Index time of 600 is identified from the Hierarchical Index structure 127 as previously described in reference to FIG. 10. In this particular example, the Index position within the Cues structure 151 is used to access the particular Cue Point 152 which corresponds to time 610 (Cue Time 153). The Cue Point 152 through data in Track Position 154 and Cluster Position 155 generally points to the Cluster structure 160 which may host several seconds' worth of multimedia data.

The multimedia data within a Cluster 160 may be stored as a Block Group 163, where individual Blocks of data corresponding to one or more access units of the elementary audio, video, subtitle, or other multimedia information exist. As such, Clusters contain block groups but can also contain only simple blocks. In the absence of a Block Group, it may be possible that a Cluster can host individual Blocks or a Simple Block. The corresponding Cluster Position 155 from the Cue Point 152 is used to locate the Cluster 160 and the desired Block 161 can be identified based on its time stamp (Block Time 162). In case where an exact time stamp is not matched, the Block with the closest time stamp can be identified.

The procedure for locating a Block according to a particular time may be repeated for multiple tracks of multimedia data such that all of the data in the corresponding Blocks are presented in a synchronized manner.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A playback device comprising:
   memory containing a client application;
   a processor configured by the client application to:
      receive a user instruction;
      request portions of media files from media servers in response to the user instruction, where at least one of the media files comprises:
         encapsulated video data;
         a reduced index identifying the location of access frames within the encapsulated video data, where each entry in the reduced index within the encapsulated video data is signaled by a flag and includes an offset to an access frame in the encapsulated video data; and a complete index comprising blocks of index information interleaved between encapsulated video data, where each block of interleaved index information:

lists the relative location of each encapsulated video frame in the encapsulated video following the block of interleaved index information and prior to the next block of interleaved index information; and includes information indicating the presentation time of each encapsulated video frame;

store a block of interleaved index information into memory from a received portion of a media file;

locate an entry of the reduced index in the received portion of the media file using a flag and storing the entry from the reduced index in memory;

access an encapsulated video frame that is an access frame using the entry from the reduced index stored in memory;

access an encapsulated video frame from the received portion of a media file using the block of interleaved index information stored into memory; and playback the encapsulated video frame that is an access frame.

2. The playback device of claim 1, wherein the relative location of each encapsulated video frame is indicated by providing the size of each encapsulated video frame.

3. The playback device of claim 1, wherein the information indicating the presentation time of an encapsulated video frame is a timestamp.

4. The playback device of claim 1, wherein an encapsulated video frame that is an access frame is a key frame.

5. The playback device of claim 1, wherein the interleaved index information further comprises information indicating whether an encapsulated video frame is a key-frame.

6. The playback device of claim 1, wherein the client application requests portions of media files by downloading specific byte ranges from the media files.

7. The playback device of claim 1, wherein the reduced index is interleaved between the encapsulated video data.

8. The playback device of claim 1, wherein the reduced index includes entries for a subset of the encapsulated video frames.

9. The playback device of claim 1, wherein each entry in the reduced index further comprises a time stamp of an access frame.

10. A playback device comprising:
memory containing a client application;
a processor configured by the client application to:
receive a user instruction;
request a byte range of a media file from a media server in response to the user instruction, where the media files comprises:
encapsulated video data;
a reduced index interleaved between the encapsulated video data and identifying the location of access frames within the encapsulated video data, where each entry in the reduced index within the encapsulated video data is signaled by a flag comprising a plurality of bits and includes an offset to an access frame in the encapsulated video data; and a complete index comprising blocks of index information interleaved between encapsulated video data, where each block of interleaved index information:

lists the relative location of each encapsulated video frame in the encapsulated video following the block of interleaved index information and prior to the next block of interleaved index information, where the relative location of each encapsulated video frame is indicated by providing the size of each encapsulated video frame; and includes information indicating the presentation time of each encapsulated video frame;

store a block of interleaved index information into memory from a received portion of a media file;

locate an entry of the reduced index in the received portion of the media file using a flag comprising a plurality of bits and storing the entry from the reduced index in memory;

access an encapsulated video frame that is an access frame using the entry from the reduced index stored in memory;

access an encapsulated video frame from the received portion of a media file using the block of interleaved index information stored into memory; and playback the encapsulated video frame that is an access frame.

11. A method comprising:
receiving a user instruction;
requesting portions of media files from media servers in response to the user instruction, where at least one of the media files comprises:
encapsulated video data;
a reduced index identifying the location of access frames within the encapsulated video data, where each entry in the reduced index within the encapsulated video data is signaled by a flag and includes an offset to an access frame in the encapsulated video data; and a complete index comprising blocks of index information interleaved between encapsulated video data, where each block of interleaved index information:

lists the relative location of each encapsulated video frame in the encapsulated video following the block of interleaved index information and prior to the next block of interleaved index information; and includes information indicating the presentation time of each encapsulated video frame;

storing a block of interleaved index information into memory from a received portion of a media file;

locating an entry of the reduced index in the received portion of the media file using a flag and storing the entry from the reduced index in memory;

accessing an encapsulated video frame that is an access frame using the entry from the reduced index stored in memory;

accessing an encapsulated video frame from the received portion of a media file using the block of interleaved index information stored into memory; and playing back the encapsulated video frame that is an access frame.

12. The method of claim 11, wherein the relative location of each encapsulated video frame is indicated by providing the size of each encapsulated video frame.

13. The method of claim 11, wherein the information indicating the presentation time of an encapsulated video frame is a timestamp.

14. The method of claim 11, wherein an encapsulated video frame that is an access frame is a key frame.

15. The method of claim 11, wherein the interleaved index information further comprises information indicating whether an encapsulated video frame is a key-frame.

16. The method of claim 11, wherein requesting portions of media files is performed by downloading specific byte ranges from the media files.

17. The method of claim 11, wherein the reduced index is interleaved between the encapsulated video data.

18. The method of claim 11, wherein the reduced index includes entries for a subset of the encapsulated video frames.

19. The method of claim 11, wherein each entry in the reduced index further comprises a time stamp of an access frame.

20. A method comprising:
  receiving a user instruction;
  requesting a byte range of a media file from a media server in response to the user instruction, where the media files comprises:
  encapsulated video data;
  a reduced index interleaved between the encapsulated video data and identifying the location of access frames within the encapsulated video data, where each entry in the reduced index within the encapsulated video data is signaled by a flag comprising a plurality of bits and includes an offset to an access frame in the encapsulated video data; and
  a complete index comprising blocks of index information interleaved between encapsulated video data, where each block of interleaved index information:
    lists the relative location of each encapsulated video frame in the encapsulated video following the block of interleaved index information and prior to the next block of interleaved index information, where the relative location of each encapsulated video frame is indicated by providing the size of each encapsulated video frame; and
    includes information indicating the presentation time of each encapsulated video frame;
  storing a block of interleaved index information into memory from a received portion of a media file;
  locating an entry of the reduced index in the received portion of the media file using a flag comprising a plurality of bits and storing the entry from the reduced index in memory;
  accessing an encapsulated video frame that is an access frame using the entry from the reduced index stored in memory;
  accessing an encapsulated video frame from the received portion of a media file using the block of interleaved index information stored into memory; and
  playing back the encapsulated video frame that is an access frame.

* * * * *